(12) United States Patent
Okada

(10) Patent No.: US 6,789,177 B2
(45) Date of Patent: Sep. 7, 2004

(54) PROTECTION OF DATA DURING TRANSFER

(75) Inventor: Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 10/095,937

(22) Filed: Mar. 13, 2002

(65) Prior Publication Data

US 2003/0041221 A1 Feb. 27, 2003

(30) Foreign Application Priority Data

Aug. 23, 2001 (JP) ........................................ 2001-252399

(51) Int. Cl.[7] ............................................. G06F 12/14
(52) U.S. Cl. ...................... 711/164; 711/163; 711/152; 713/182; 713/183; 713/185; 713/202
(58) Field of Search ............................ 380/29; 711/111, 711/112, 145, 152, 163, 164; 713/182, 183, 185, 202

(56) References Cited

U.S. PATENT DOCUMENTS

| | | | | |
|---|---|---|---|---|
| 4,629,872 A | * | 12/1986 | Hallberg | 235/380 |
| 4,736,419 A | * | 4/1988 | Roe | 713/185 |
| 5,317,638 A | * | 5/1994 | Kao et al. | 380/29 |
| 5,687,237 A | * | 11/1997 | Naclerio | 380/29 |
| 5,878,136 A | * | 3/1999 | Kim et al. | 705/60 |
| 6,333,983 B1 | * | 12/2001 | Enichen et al. | 380/273 |

FOREIGN PATENT DOCUMENTS

| | | | |
|---|---|---|---|
| DE | 19925389 A1 | * | 12/2000 |
| EP | 912052 A1 | * | 4/1999 |
| EP | 1081889 A2 | * | 3/2001 |

OTHER PUBLICATIONS

"Content Protection for Prerecorded Media Specification DVD Book," Revision 0.92, Intel Corporation, Jun. 28, 2000, pp. ii-x, 1-1 through 2-9.
"Content Protection for Recordable Media Specification, Portable ATA Storage Book," Intel Corporation, Revision 0.91, Nov. 13, 2000, pp. ii-vi and Chapters 1-4.
"Digital Transmission Content Protection Specification vol. 1 (Informational Version)," Intel Corporation, Revision I.I, Jul. 25, 2000, pp. 2-81.

* cited by examiner

Primary Examiner—B. James Peikari
(74) Attorney, Agent, or Firm—Staas & Halsey LLP

(57) ABSTRACT

A method to protect data of a drive from illegal accessing without increasing the load of processing on the drive side and to prevent not only illegal copying on the drive side but also an illegal action on the host unit side. Authentication of the drive is executed by the host unit. If the drive is authenticated, then a contents key is encrypted using a host ID registered in advance in a storage area of the host unit and a session key and first identification information read out from a storage area of the drive. Then, the encrypted contents key is transferred to the drive while contents data to be recorded and stored into the drive are encrypted with the contents key by the host unit. Thereafter, the encrypted contents data is transferred to the drive.

20 Claims, 10 Drawing Sheets

PROTECTION OF DATA DURING TRANSFER

BACKGROUND OF THE INVENTION

1) Field of the Invention

Techniques for protecting data from illegal accessing when data of music, videos or the like is transferred between a data recording apparatus for recording data to store it and an access apparatus which accesses the data recording apparatus. The data recording apparatus is, for example, a digital recording and playback apparatus for recording data of music, videos or the like, and the access apparatus is, for example, a personal computer, or a host unit (CPU) in a data recording apparatus.

In recent years, thanks to the improvement in performance of personal computers and the advent of the MPEG2-ISI, it has become easy to handle data of videos and music. Further, it has become possible to acquire a disk of a large capacity of several tens GB (gigabytes)at a moderate price, and also new digital recording and playback apparatus based on a hard disk drive (HDD) or an optical disk drive have appeared.

The key, when it is tried to widely popularize such less expensive data recording apparatus of high performances as described above, is the protection of the copyright of various data (contents) recorded by the data recording apparatus That is, necessary to prevent illegal copying, with high certainty, to guard the rights of the provider of the contents.

Embodiments herein provide techniques by which, when data is transferred between a host unit (access apparatus) and a drive (data recording apparatus), the data can be protected from illegal accessing, thereby protecting the copyright with high certainty and without imposing a burden of processing on the drive recording side.

2) Description of the Related Art

An HDD recorder, a storage-type set top box (STB), or the like, is presently available as a digital recording and playback apparatus presently. For the object of copyright protection, an HDD built in the apparatus is in most cases fixed mechanically so that it may not be removed from the apparatus. In contrast, from a standpoint of a user, there is strong to replace the HDD with a new HDD for a PC (Personal Computer), because HDD capacity has been and is increasing progressively in recent years. The apparatus (the other part than the HDD) may beleft as it is.

This gives rise to a subject of the protection of the copyright upon transfer of data between the host unit and the disk drive (in other words, protection of data from illegal accessing). As a copyright protection method (data protection method) which makes use of the standard interface e.g. ATA/ATAPI (Advances Technologies Attachment/ATA Packet Interface) for a PC, the CPPM (Content Protection for Prerecorded Media) and the CPRM (Content Protection for Recordable Media) are conventionally known.

In the CPRM, an ID (identification information; for example, a media ID of a medium) unique to a drive is set in the drive, and a writing process of writing content data from the host unit onto the disk is performed in accordance with the following procedure [steps (a1) to (a8)].

(a1) A request for transfer of session keys (a plurality of media key blocks, a plurality of secret keys) and a first drive ID (static ID) stored in a ROM area in the drive is issued from the host unit to the drive.

(a2) The session keys and the first drive ID are transferred from the drive to the host unit in accordance with the request in step (a1).

(a3) The session keys and the first drive ID from the drive are stored into a RAM area of the host unit.

(a4) A random number generated on the host unit side is transmitted to the drive, and a request for transfer of a raw second drive ID (dynamic ID) and an encrypted second drive ID is issued from the host unit to the drive.

(a5) The second drive ID is encrypted using the random number from the host unit and a drive key (secret key) written in advance in a hidden area, in accordance with the request in step (a4), and the raw second drive ID and the encrypted second drive ID are transferred from the drive to the host unit.

(a6) A drive key (equivalent) is generated from the session keys and first drive ID which have been stored in step (a3) by the host unit, and the raw second drive ID from the drive is encrypted using the drive key and the random number generated in step (a4). Thereafter, the second drive ID encrypted on the host unit side and the encrypted second drive ID from the drive are compared with each other to discriminate whether or not they are coincident.

(a7) If it is discriminated in step (a6) that the second drive ID encrypted on the host unit side and the encrypted second drive ID from the drive are coincident, then it is discriminated that the drive authentication results in success, and contents data to be written into the drive is encrypted using the contents key and the contents key is encrypted using the session keys and the drive key (equivalent) generated from the first drive ID. Thereafter, the encrypted contents data and the encrypted contents key are transferred from the host unit to the drive and written onto the disk.

(a8) If it is discriminated in step (a6) that the second drive ID encrypted on the host unit side and the encrypted second drive ID from the drive are not coincident, then it is discriminated that the drive authentication results in failure, and the processing is interrupted without transferring the contents data to the drive.

On the other hand, in the case of CPRM, when the contents data written on the disk as described above is read out from the disk to the host unit, after authentication of the drive is performed in accordance with a procedure [steps (a1) to (a6)] similar to the procedure described above, the contents data is read out in accordance with such a procedure [steps (b1) and (b2)] as described below.

(b1) If it is discriminated in step (a6) that the second drive ID encrypted on the host unit side and the encrypted second drive ID from the drive are coincident with each other, then it is discriminated that the drive authentication results in success, and the host unit reads out the encrypted contents key and the encrypted contents data from the drive (disk). Thereafter, the encrypted contents key is decrypted using the drive key (equivalent) generated from the session keys and the first drive ID, and then, the encrypted contents data is decrypted using the decrypted contents key.

(b2) If it is discriminated in step (a6) that the second drive ID encrypted on the host unit side and the encrypted second drive ID from the drive are not coincident, then it is discriminated that the drive authentication results in failure, and the processing is interrupted without reading out the contents data from the disk.

It is to be noted that the CPPM is a copyright protection system only for readout, and in the CPPM, the steps (a1) to (a6), (b1) and (b2) described above are executed.

The drive authentication procedure [steps (a1) to (a6)] described above is called a challenge/response method, and in the CPRM or the CPPM, authentication is executed only on the host unit side. In other words, unidirectional drive authentication is executed, and as a result, a burden of processing on the drive side is reduced.

Further, a contents key and contents data are recorded on a disk based on an ID unique to the drive. Consequently, even if data recorded on the disk of the drive is illegally copied (volume copy) onto another medium, since the ID is not coincident upon data readout, readout of the illegally copied data is impossible. Accordingly, the CPRM and the CPPM are effective for prevention of illegal copying.

As a representative copyright protection method other than the CPRM and the CPPM, the DTCP (Digital Transmission Content Protection) which utilizes the IEEE1394-IF is available. The DTCP assumes data transfer between different apparatuses and is based on mutual authentication. With the DTCP, two methods are available: a full authentication method; and a restrict authentication method. In the full authentication method, an electronic signature algorithm of a public-key/secret-key cipher technique and a DH (Diffie-Hellman) key exchanging algorithm are adopted, and the two algorithms are based on an elliptic curve cipher.

Following is a description of a mutual authentication procedure [steps (c1) to (c9)] where the DTCP of the full authentication method is used upon data transfer between the host unit and the disk drive.

(c1) A request for the host authentication is issued from the host unit to the drive. At the same time, the host unit transmits to the drive a random number and an ID unique to the host unit. The ID unique to the host unit is proof-information produced for every apparatus by the license organization of the DTCP (DTLA, a company of the United States), and includes a public-key and an electronic signature.

(c2) The drive receives the random number and the ID unique to the host unit from the host unit and confirms whether or not the ID unique to the host unit is information produced by the DTLA in accordance with a verification process of an electronic signature, and checks whether or not the ID unique to the host unit is reported on an illegal apparatus list stored on the drive side.

(c3) If it is confirmed in step (c2) that there is no problem, then a request for drive authentication is issued from the drive to the host unit. At the same time, the drive transmits the random number and an ID unique to the drive. Also the ID unique to the drive is, similarly to the ID unique to the host unit, proof information produced for every apparatus by the DTLA.

(c4) The host unit receives the random number and the ID unique to the drive from the drive and confirms, similarly as in step (c2), whether or not the ID unique to the drive is information produced by the DTLA in accordance with a verification process of an electronic signature, and confirms whether or not the ID unique to the drive is reported on an illegal apparatus list stored on the host unit side.

(c5) If it is confirmed in step (c4) that there is no problem, then each of the units (host unit/drive) calculates DH information of the unit itself in order to share an encryption key in accordance with a DH key exchanging method (delivery/sharing method).

(c6) The DH information of the host unit is transmitted from the host unit to the drive.

(c7) The drive confirms whether or not the DH information received from the host unit is data transmitted from the host unit correctly, in accordance with the verification of an electronic signature.

(c8) Conversely, the DH information of the drive is transmitted from the drive to the host unit.

(c9) The host unit confirms whether or not the DH information received from the drive is data transmitted from the drive correctly, in accordance with the verification of an electronic signature.

As described above, in the mutual authentication methods represented by the DTCP, since the host unit and the drive both have a facility (mutual authentication facility) which checks whether or not the drive and the host unit are correct opposite parties for performing data transmission, respectively, not only illegal copying on the drive side is prevented with certainty, but also an illegal action (impersonation or the like) on the host unit side can be prevented with certainty.

It is to be noted that, while the DTCP of the restrict authentication method performs authentication using a common secret key and a hash function, also in the DTCP of the restrict authentication method, basically the host unit and the drive have an equal relationship to each other, similar to the DTCP of the full authentication method described above, and execute similar authentication processes. Therefore, description of the same is omitted herein to avoid redundancy.

SUMMARY OF THE INVENTION

In the CPRM and the CPPM described above, however, because the drive authentication is executed only on the host unit side, although illegal copying on the drive side can be prevented with certainty, the authentication of the host unit cannot be executed on the drive side. Accordingly, if the authentication of the drive results in success, then it is possible for a plurality of irregular apparatus (host units) without rights to access the drive and play back the contents data recorded on the disk. Therefore, there is a problem in that the data of the drive cannot be protected from illegal accessing by an irregular host unit and an illegal action (impersonation or the like) on the host unit side cannot be prevented.

Thus, if the DTCP described above is adopted, then since not only the drive authentication on the host unit side but also the host authentication on the drive side are executed, both illegal copying on the drive side and illegal action on the host unit side can be prevented. However, the authentication process of the DTCP is very complicated and the host unit and the drive have an equal relationship as described above. Therefore, the drive side in particular is obliged to execute a complicated authentication process. Consequently, the processing load on the drive side is increased unfavorably.

Meanwhile, in recent years, there has been begun to develop a kind of business of renting a set top box (STB) at a moderate price. As the development of the business just described proceeds, an illegal user has appeared who not only illegally copies data recorded on the hard disk drive in the STB but also removes the hard disk drive itself and illegally diverts it as a drive of a personal computer.

As a countermeasure against such an illegal user as just described, there is demand to adopt a mutual authentication method such as the DTCP described above.

However, in the DTCP, the authentication process is very complicated and the load of the processing on the drive side is heavy as described above. Therefore, there is demand to prevent such illegal diversion as described above with certainty by simpler and easier processing without increasing the load on the drive side.

It is an aspect of embodiment(s) described herein to provide a technique which can protect data from illegal accessing without increasing the load of processing on the drive side, to prevent not only illegal copying on the data recording apparatus (drive) side but also to prevent an illegal action on the access apparatus (host unit) side, thereby protecting the copyright and further preventing illegal diversion of the data recording apparatus.

In order to attain the aspect described above, according to an aspect of embodiment(s) described herein, there is provided a data protection method for protecting, when data transfer is performed between a data recording apparatus for recording and storing data and an access apparatus which accesses the data recording apparatus, data of the data recording apparatus from illegal accessing, comprising a step by the access apparatus of executing authentication of the data recording apparatus, a step of encrypting, when the data recording apparatus is authenticated, a contents key with access apparatus identification information registered in advance in a storage area of the access apparatus and a session key and first identification information read out from a storage area of the data recording apparatus, a step of transferring the encrypted contents key from the access apparatus to the data recording apparatus in order to write the encrypted contents key into the data recording apparatus, a step by the access apparatus of encrypting contents data to be recorded and stored into the data recording apparatus with the contents key, and a step of transferring the encrypted contents data from the access apparatus to the data recording apparatus in order to write the encrypted contents data into the data recording apparatus.

According to another aspect of embodiment(s) described herein, there is provided a data protection method for protecting, when data transfer is performed between a data recording apparatus for recording and storing data and an access apparatus which accesses the data recording apparatus, data of the data recording apparatus from illegal accessing, comprising a step of writing contents data encrypted with a contents key into the data recording apparatus and writing the contents key, which is encrypted with predetermined access apparatus identification information and a session key and first identification information registered in advance in a storage area of the data recording apparatus, into the data recording apparatus, a step by the access apparatus of executing authentication of the data recording apparatus, a step of reading out, when the data recording apparatus is authenticated, the encrypted contents data and the encrypted contents key from the data recording apparatus and transferring the encrypted contents data and the encrypted contents key to the access apparatus, a step by the access apparatus of decrypting the encrypted contents key with the access apparatus identification information registered in advance in a storage area of the access apparatus and the session key and first identification information read out from the storage area of the data recording apparatus, and a step of decrypting the encrypted contents data with the decrypted contents key.

According to a further aspect of embodiment(s) described herein, there is provided a data protection method for protecting, when data transfer is performed between a data recording apparatus for recording and storing data and an access apparatus which accesses the data recording apparatus, data of the data recording apparatus from illegal accessing, comprising a step of transferring access apparatus identification information, which is registered in advance in a storage area of the access apparatus connected first to the data recording apparatus when the data recording apparatus is in an initial state, from the access apparatus to the data recording apparatus and writing the access apparatus identification information into a writable-once storage area, a step by the data recording apparatus of performing, every time the access apparatus thereafter accesses the data recording apparatus, authentication of the access apparatus based on the access apparatus identification information written in the writable-once storage area, a step by the access apparatus of performing authentication of the data recording apparatus when the access apparatus is authenticated, a step of encrypting, when the data recording apparatus is authenticated and contents data is to be recorded and stored into the data recording apparatus, a contents key with a session key and first identification information read out from the storage area of the data recording apparatus, a step of transferring the encrypted contents key from the access apparatus to the data recording apparatus in order to write the encrypted contents key into the data recording apparatus, a step by the access apparatus of encrypting the contents data to be recorded and stored into the data recording apparatus with the contents key, and a step of transferring the encrypted contents data from the access apparatus to the data recording apparatus in order to write the encrypted contents data into the recording apparatus.

The data protection method may further comprise a step of reading out and transferring, when both of the access apparatus and the data recording apparatus are authenticated and contents data is to be read out from the data recording apparatus, the encrypted contents data and the encrypted contents key from the data recording apparatus to the access apparatus, a step by the access apparatus of decrypting the encrypted contents key with the session key and first identification information read out from the storage area of the data recording apparatus, and a step of decrypting the encrypted contents data with the decrypted contents key.

Further, the step of performing authentication of the access apparatus may include a step by the data recording apparatus of generating a random number, a step of transferring the random number from the data recording apparatus to the access apparatus, a step by the data recording apparatus of encrypting the access apparatus identification information with the random number, a step by the access apparatus of encrypting the access apparatus identification information with the random number from the data recording apparatus, a step of transferring the encrypted access apparatus identification information from the access apparatus to the data recording apparatus, and a step of comparing the encrypted access apparatus identification information from the access apparatus and the access apparatus identification information encrypted by the data recording apparatus with each other to discriminate whether or not the encrypted access apparatus identification information and the access apparatus identification information encrypted by the data recording apparatus coincide with each other, the access apparatus being authenticated when it is discriminated that the encrypted access apparatus identification information and the access apparatus identification information encrypted by the data recording apparatus coincide with each other.

According to embodiment(s) described herein, when the access apparatus (host unit) writes contents data and a contents key into the data recording apparatus, since the contents key is encrypted with not only the identification information of the data recording but also a factor of the access apparatus identification information (host ID) added thereto, only the original access apparatus which has written the contents data and the contents key into the data recording apparatus can read out the contents data. In particular, even if an access apparatus other than the original access apparatus reads out the contents data from the data recording apparatus, since the identification information of this access apparatus is different from that of the original access apparatus, the contents key cannot be decrypted correctly. Consequently, the contents data cannot be decrypted correctly and cannot be read out. Accordingly, the data of the data recording apparatus can be protected from illegal accessing without increasing the load of processing on the data recording apparatus side by adopting the unidirectional authentication of the CPPM, the CPRM or the like. Consequently, not only illegal copying on the data recording apparatus side but also illegal readout or illegal copying of data by impersonation or the like on the access apparatus side can be prevented with certainty, and reliable protection of the copyright can be anticipated.

Further, identification information (a host ID) of the access apparatus (host unit) connected first to the data recording apparatus (drive) when the data recording apparatus is in an initial state is written into the writable-once storage area in the data recording apparatus. Thereafter, it is authenticated whether or not the access apparatus, which has accessed the data recording apparatus, is an access apparatus (original host) connected first to the data recording apparatus, based on the identification information written in the storage area. Then, only if it is authenticated that the access apparatus is the original access apparatus, then accessing (data writing/readout) to the data recording apparatus is authorized.

Consequently, if a very simple authentication process is executed on the data recording apparatus side, then an access apparatus other than the original access apparatus cannot access the data recording apparatus. Accordingly, the data of the data recording apparatus can be protected from illegal accessing without increasing the load of processing on the data recording apparatus side, and not only illegal copying on the data recording apparatus side but also illegal readout and illegal copying of data by impersonation or the like on the access apparatus side can be prevented with certainty, and reliable protection of the copyright can be anticipated.

Further, since the original access apparatus connected first to the data recording apparatus can access the data recording apparatus, such illegal diversion of the data recording apparatus that, for example, a hard disk drive (data recording apparatus) is dismounted from a set top box (STB) and is diverted in a system other than the STB can be prevented with certainty.

It is to be noted that, by combining the technique, wherein identification information of an access apparatus connected first is written into a write-once storage area of a data recording apparatus and the identification information is used to perform authentication of the access apparatus, with the technique, wherein a contents key to be written into the data recording apparatus is encrypted using the identification information of the data recording apparatus and the identification information of the access apparatus, even if some measures are taken to illegally pass the authentication of the access apparatus, any access apparatus other than the original access apparatus cannot decrypt the contents key read out from the data recording apparatus nor can read out the contents data. Accordingly, illegal readout and illegal copying of data by impersonation or the like on the access apparatus side can be prevented with more certainty.

The above and other aspects, features and advantages will become apparent from the following description and the appended claims, taken in conjunction with the accompanying drawings in which like parts or elements are denoted by like reference characters.

DESCRIPTION OF THE PREFERRED EMBODIMENTS

In the following, embodiments of the present invention are described with reference to the drawings.

[1] Description of the First Embodiment

Figure 1:
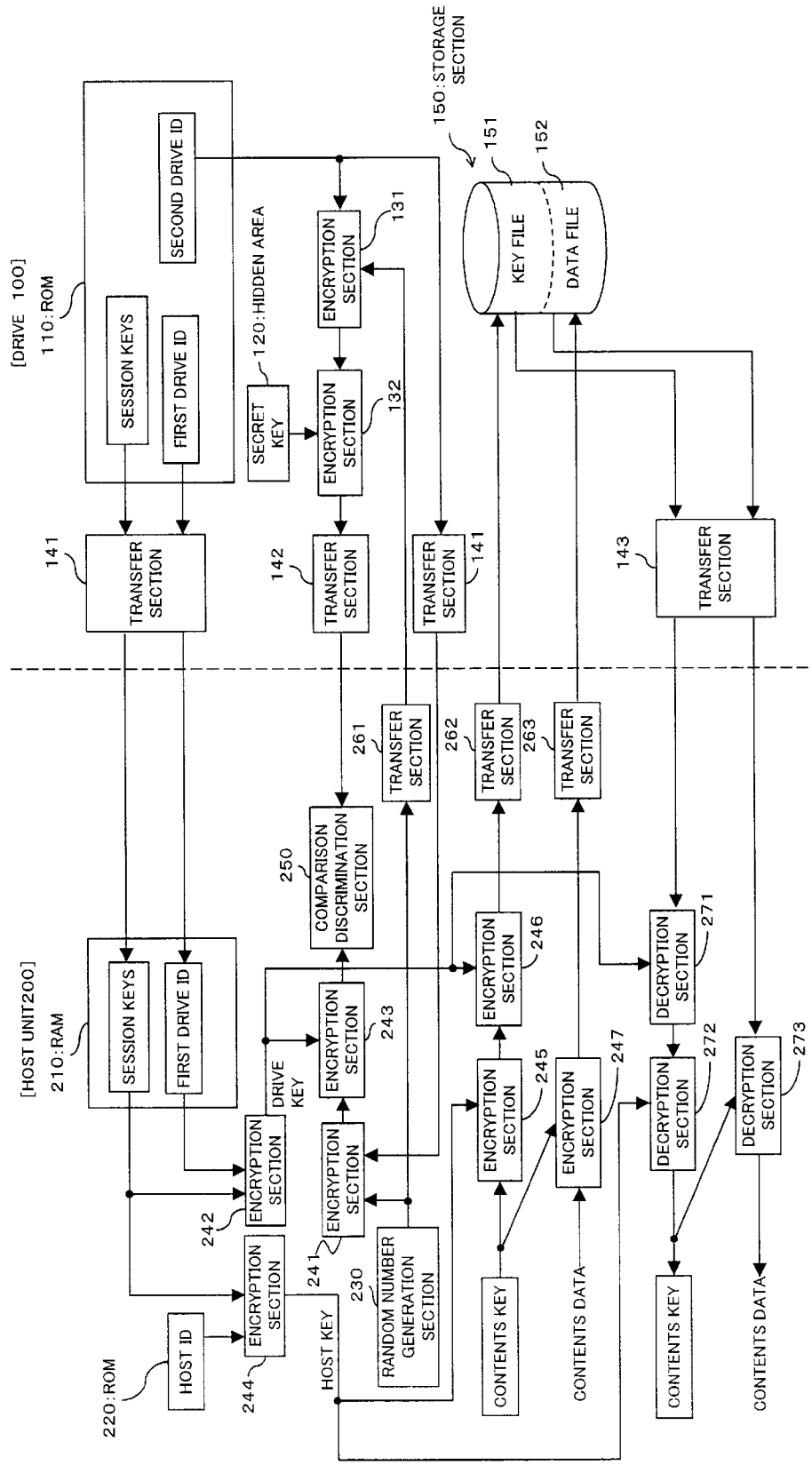
FIG. 1 is a block diagram showing a functional configuration of a data protection system (an access apparatus and a data recording apparatus) to which a data protection method as a first embodiment of the present invention is applied.

FIG. 1 is a block diagram showing a functional configuration of a data protection system (an access apparatus and a data recording apparatus) to which a data protection method as a first embodiment of the present invention is applied. Referring to FIG. 1, the data protection system in the first embodiment protects, when data transmission between a drive (for example, a HDD) 100 as a data recording apparatus which records and stores data and a host unit (for example, a CPU) 200 as an access apparatus which accesses the drive 100 is performed, data of the drive 100 from illegal accessing.

The drive 100 includes a ROM 110, a hidden area 120, encryption sections 131 and 132, transfer sections 141 to 143, and a storage section 150.

The ROM (Read Only Memory; a first storage area) 110 stores session keys, a first drive ID (first identification information) and a second drive ID (second identification information) registered in advance. The hidden area 120 stores a drive key (secret key) registered in advance therein.

The encryption section 131 encrypts the second drive ID read out from the ROM 110 using a random number from the host unit 200. The encryption section 132 further encrypts an encryption result by the encryption section 131 using the drive key (secret key) read out from the hidden area 120.

The encryption sections 131 and 132 function as first encryption means which encrypts, in response to a request from the host unit 200, the second drive ID using a random number transmitted from the host unit 200 together with the request and the drive key (secret key) of the drive 100.

The transfer section (first transfer means) 141 reads out the session keys, first drive ID and second drive ID from the ROM 110 in response to a request from the host unit 200 and transmits them to the host unit 200.

The transfer section (second transfer means) 142 transmits the second drive ID encrypted by the encryption sections 131 and 132 to the host unit 200.

The transfer section (third transfer means) 143 reads out encrypted contents data and an encrypted contents key from the storage section 150 in response to a request from the host unit 200 and transmits them to the host unit 200.

The storage section 150 is a disk medium itself of the drive 100, and stores contents data and a contents key written from the host unit 200 and includes a key file 151 for storing the contents key and a data file 152 for storing the contents data. It is to be noted that the contents data to be stored in the storage section 150 is encrypted with the contents key. The contents key to be stored in the storage section 150 is, as hereinafter described, encrypted with a host ID (predetermined access apparatus identification information), the session key and the first drive ID of the drive 100.

The host unit 200 includes a RAM 210, a ROM 220, a random number generation section 230, encryption sections 241 to 247, a comparison discrimination section 250, transfer sections 261 to 263, and decryption sections 271 to 273.

The RAM (Random Access Memory) 210 temporarily stores the session keys and first drive ID transmitted from the drive 100. The ROM (Read Only Memory; a second storage area) 220 stores the host ID (access apparatus identification information) which is registered in advance and serves as identification information unique to the host unit 200.

The random number generation section (first random number generation means) 230 generates a random number when the host unit 200 accesses the drive 100.

The encryption section 241 encrypts the raw second drive ID transferred from the drive 100 using the random number generated by the random number generation section 230. The encryption section 242 encrypts the first drive ID stored in the RAM 210 using session keys stored in the RAM 210 to generate a drive key (equivalent), and outputs the drive key (equivalent). The encryption section 243 further encrypts the encryption result by the encryption section 241 using the drive key (equivalent) from the encryption section 242.

The encryption sections 241 to 243 function as second encryption means which encrypts the second drive ID read out from the ROM 110 of the drive 100 using not only the random number generated by the random number generation section 230 but also the session keys and first drive ID read out from the ROM 110 of the drive 100.

The comparison discrimination section (first comparison discrimination means) 250 compares the encrypted second drive ID transferred from the drive 100 through the transfer section 142 and the second drive ID encrypted by the encryption sections 241 to 243, and discriminates whether or not they are coincident.

If the comparison discrimination section 250 discriminates that the two second drive IDs are coincident with each other when the host unit 200 records and stores the contents data into the drive 100 (storage section 150) then there is operation of the encryption sections 244 to 247 and transfer sections 261 to 263 described hereinafter. Further, if the comparison discrimination section 250 discriminates that the two second drive IDs are coincident with each other when the host unit 200 reads out the contents data from the drive 100 (the storage section 150), then there is operation of the decryption sections 271 to 273 described hereinafter.

The encryption section 244 encrypts the host ID stored in the ROM 220 using the session keys stored in the RAM 210 to produce and output a host key. The encryption section 245 encrypts a contents key using the host key which is an encryption result of the encryption section 244. The encryption section 246 further encrypts an encryption result of the encryption section 245 using the drive key (equivalent) from the encryption section 242.

If the comparison discrimination section 250 discriminates that the two second drive IDs are coincident with each other, then the encryption sections 244 to 246 and encryption section 242 described above function as third encryption means which encrypts the contents key using the host ID read out from the ROM 220, and the session keys and first drive ID stored in the RAM 210.

The encryption section (fourth encryption means) 247 encrypts the contents data to be recorded and stored into the drive 100 using the contents key.

The transfer section (fourth transfer means) 261 transfers the random number generated by the random number generation section 230 to the drive 100 (encryption section 131).

The transfer section (fifth transfer means) 262 transfers the contents key encrypted by the encryption sections 242 and 244 to 246 to the drive 100 in order to write the encrypted contents data into the storage section 150 (key file 151) of the drive 100.

The transfer section (sixth transfer means) 263 transfers the contents data encrypted by the encryption section 247 to the drive 100 in order to write the encrypted contents data into the storage section 150 (data file 152) of the drive 100.

The decryption section 271 decrypts the encrypted contents key read out from the storage section 150 (key file 151) of the drive 100 using the drive key (equivalent) from the encryption section 242. The decryption section 272 further decrypts the decryption result by the decryption section 271 using the host key from the encryption section 244.

If the comparison discrimination section 250 discriminates that the two second drive IDs are coincident with each other, then the decryption sections 271 and 272 (described above) function as first decrypting means which decrypts the encrypted contents key read out from the storage section 150 (key file 151) of the drive 100 using the host ID read out from the ROM 220 and the session keys and first drive ID stored in the RAM 210.

The decryption section (second decrypting means) 273 decrypts the encrypted contents data read out from the storage section 150 (data file 152) of the drive 100 using the contents key decrypted by the decryption sections 271 and 272.

The random number generation section 230, encryption sections 241 to 247, comparison discrimination section 250, transfer sections 261 to 263 and decryption sections 271 to 273 of the host unit 200 described above may be implemented by software (an access program) for exclusive use.

The access program is distributed in a form wherein it is recorded on a computer-readable recording medium such as, for example, a flexible disk or a CD-ROM. In the first embodiment, the access program is stored in advance in a ROM (Read Only Memory) or the like which is a component of the host unit 200. This access program is read out by a CPU of the host unit 200 and executed to implement the functions of the random number generation section 230, encryption sections 241 to 247, comparison discrimination section 250, transfer sections 261 to 263 and decryption section 271 to 273 described above. It is to be noted that the access program may be recorded in advance in a storage apparatus (recording medium) such as, for example, a magnetic disk, an optical disk or a magneto-optical disk and distributed from the storage apparatus to a computer through a communication path. Also the functions of the drive 100 as the encryption sections 131 and 132 and transfer sections 141 and 142 are implemented by software for exclusive use.

While the drive 100 includes the transfer sections 141 to 143 for individual kinds of data to be transferred from the drive 100 to the host unit 200, actually the functions as the transfer sections 141 to 143 may be integrated so that they are implemented as one transfer section. Also the functions of the encryption sections 131 and 132 may be integrated so that they may be implemented as one encryption section.

Similarly, while the host unit 200 includes the transfer sections 261 to 263 for individual kinds of data to be transferred from the host unit 200 to the drive 100, actually the functions of the transfer sections 261 to 263 may be integrated so that they are implemented as one transfer section. Also the functions of the encryption sections 241 to 247 may be integrated so that they are integrated as one encryption section. Further, also the functions of the decryption sections 271 to 273 may be integrated so that they are implemented as one decryption section.

Figure 2:
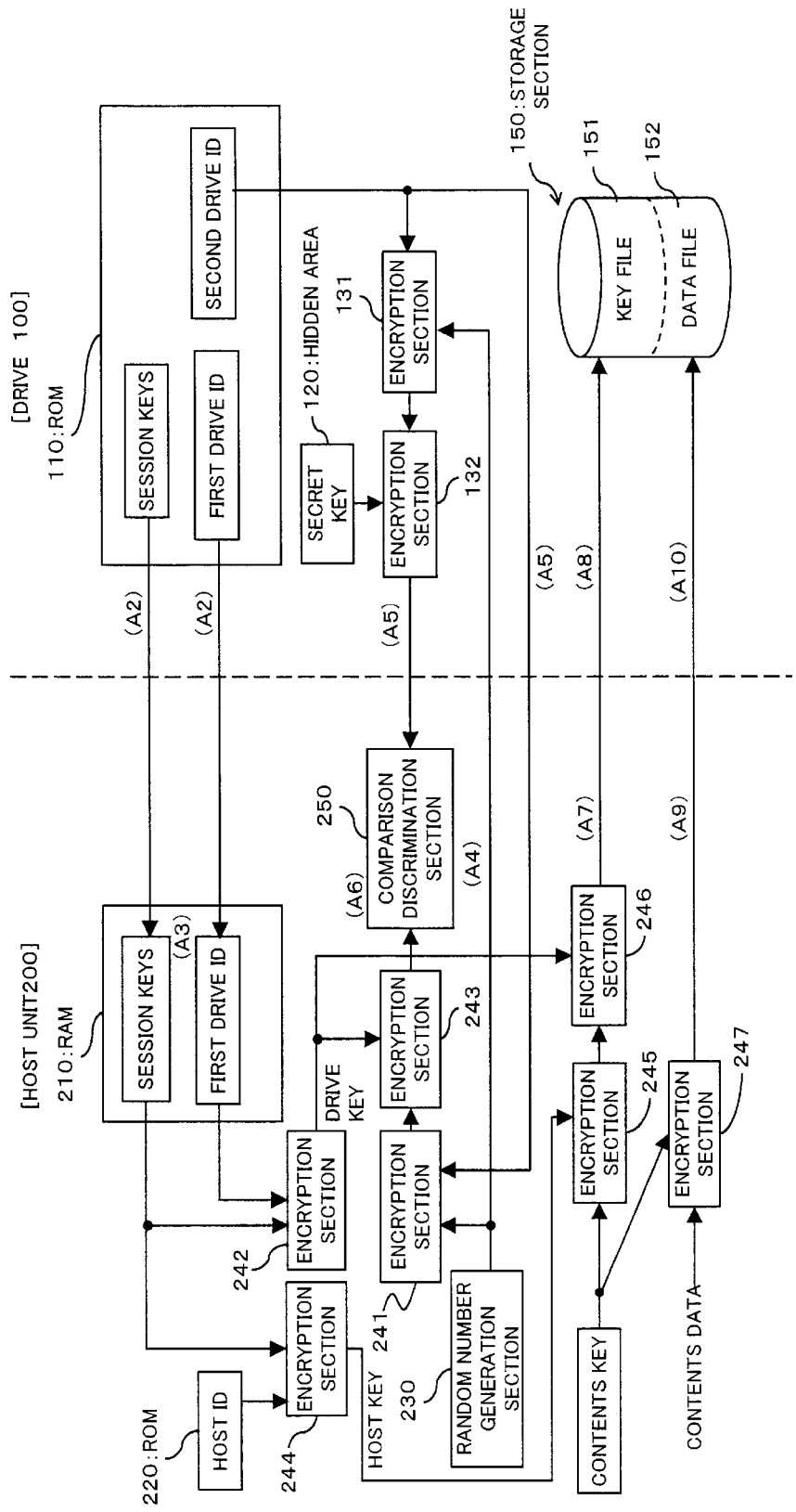
FIG. 2 is a block diagram illustrating contents data writing in the data protection system of the first embodiment.
Figure 3:
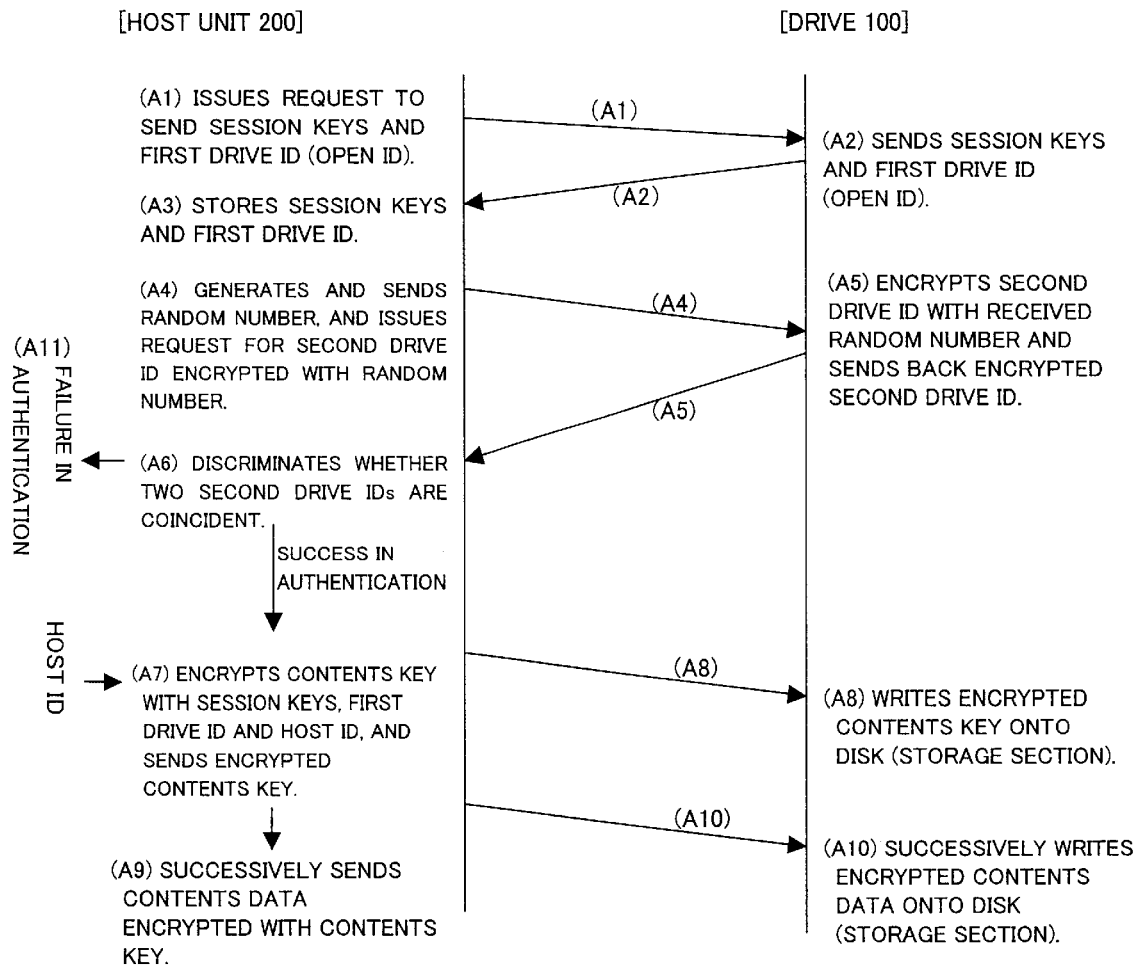
FIG. 3 is a diagrammatic view illustrating a contents data writing procedure in the first embodiment.
Figure 4:
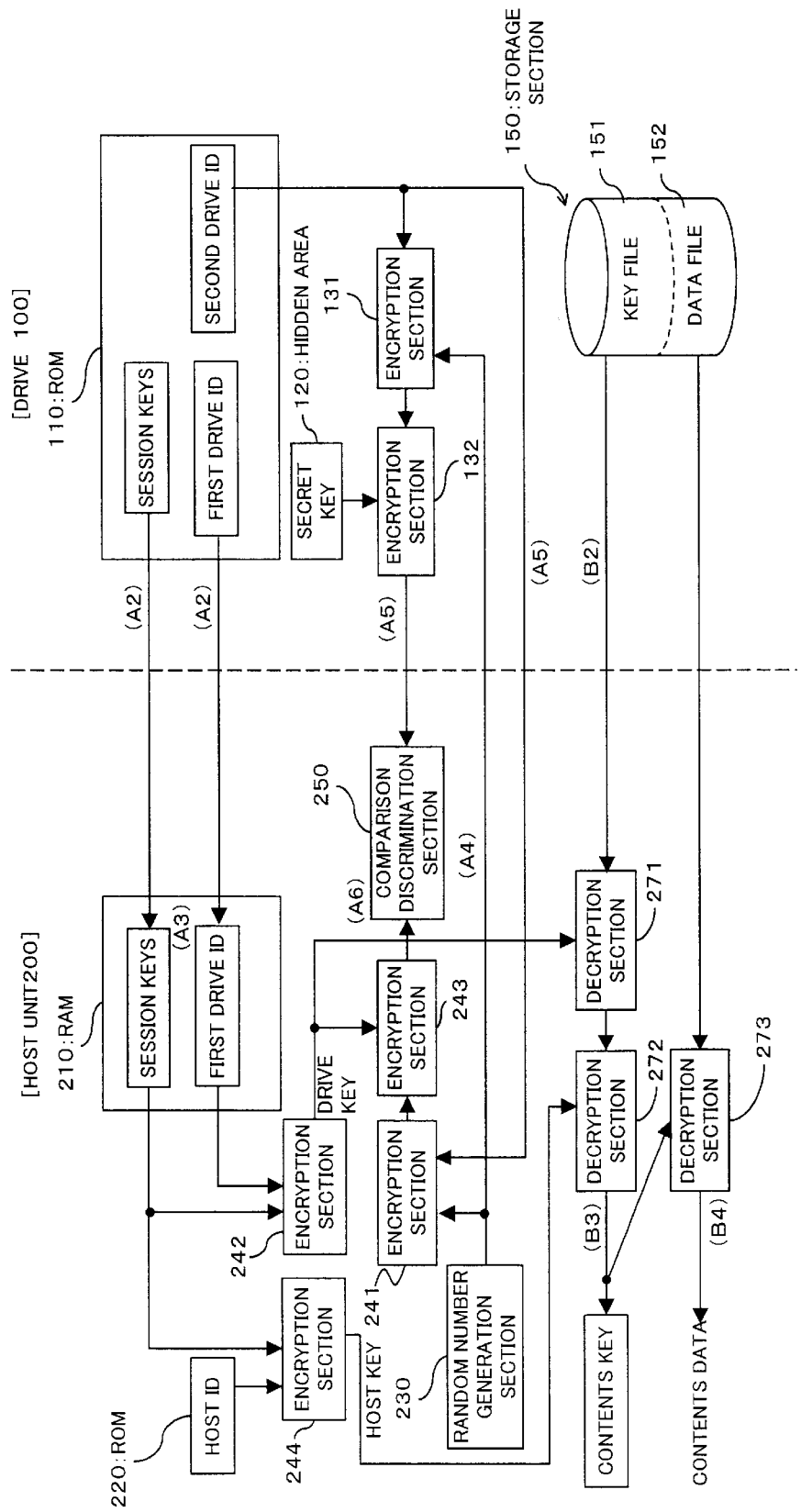
FIG. 4 is a block diagram showing contents data reading in the data protection system of the first embodiment.
Figure 5:
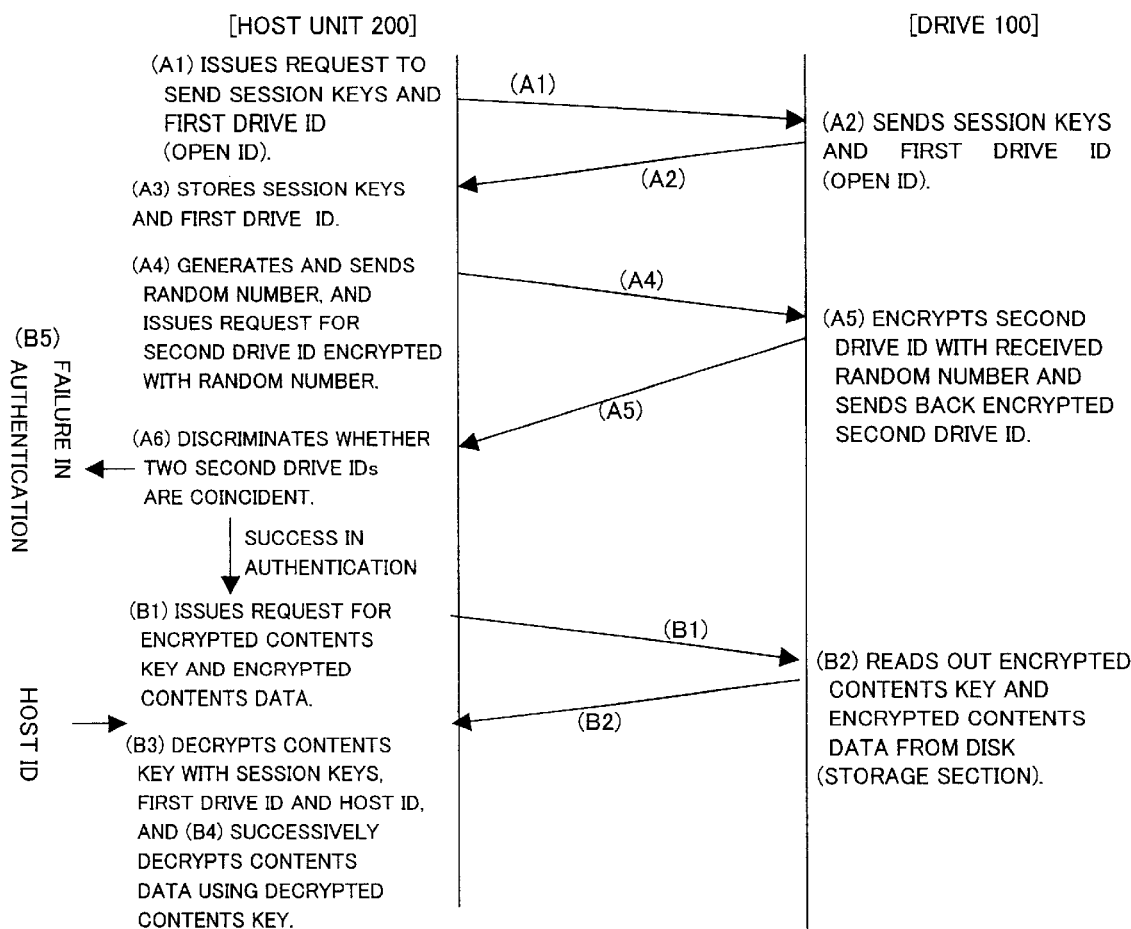
FIG. 5 is a diagrammatic view illustrating a contents data reading procedure in the first embodiment.

Now, operation of the data protection system of the first embodiment configured as described above is described with reference to FIGS. 2 to 5. FIG. 2 is a block diagram showing contents data writing operations in the data protection system of the first embodiment. FIG. 3 is a diagrammatic view illustrating a contents data writing procedure in the first embodiment. FIG. 4 is a block diagram showing contents data readout operations in the data protection system of the first embodiment. FIG. 5 is a diagrammatic view illustrating a contents data readout procedure in the first embodiment.

In the first embodiment, the contents key is encrypted using the ID unique to the host unit when the contents data and the contents key are written (although the method of the CPRM described above is used). In particular, in the first embodiment, the first drive ID and second drive ID unique to the drive are set in the drive 100, and the host ID unique to the host unit is set in the host unit 200. Further, writing of the contents data from the host unit 200 into the drive 100 (storage section 150) is performed by a procedure described below [steps (A1) to (A11)]. It is to be noted that, in FIGS. 2 and 3, reference characters (A1) to (A11) are entered as symbols at portions wherein processes corresponding to the steps (A1) to (A11) are executed.

(A1) The host unit 200 issues a request for transfer of the session keys (a plurality of media key blocks, and a plurality of secret keys) and the first drive ID (static ID) stored in the region of the ROM 110 area in the drive 100 to the drive 100.

(A2) The session keys and the first drive ID are read out from the ROM 110 and transferred from the drive 100 to the host unit 200 in accordance with the request in step (A1) (the function of the transfer section 141 of FIG. 1).

(A3) The session keys and the first drive ID from the drive 100 are stored into the RAM 210 of the host unit 200.

(A4) A random number is generated by the random number generation section 230 of the host unit 200 side and is transferred to the drive 100 (the function of the transfer section 261 of FIG. 1). At the same time, the host unit 200 issues a request for transfer of a raw second drive ID (dynamic ID) and the second drive ID encrypted with the random number just described to the drive 100.

(A5) The encryption sections 131 and 132 encrypt the second drive ID using the random number from the host unit 200 and the drive key (secret key) written in the hidden area 120 in accordance with the request in step (A4). Therefore, the raw second drive ID and the encrypted second drive ID are transferred from the drive 100 to the host unit 200 (the functions of the transfer sections 141 and 142 of FIG. 1).

(A6) In the host unit 200, the encryption section 242 produces a drive key (equivalent) based on the session keys and first drive ID stored in step (A3), and encrypts the raw second drive ID from the drive 100 using the drive key and the random number generated in step (A4). Thereafter, the comparison discrimination section 250 compares the second drive ID (encrypted on the host unit 200 side) with the encrypted second drive ID (from the drive 100) to discriminate whether or not they are coincident with each other. In the first embodiment, authentication of the drive 100 is performed on the host unit 200 side in steps (A1) to (A6) described above.

(A7) If it is discriminated in step (A6) that the second drive ID encrypted on the host unit 200 side and the encrypted second drive ID from the drive are coincident, then it is discriminated that the authentication of the drive 100 results in success, and the encryption sections 242 and 244 to 246 encrypt the contents key using the host ID read out from the ROM 220 and the session keys and first drive ID stored in the RAM 210. In particular, the contents key is encrypted using not only a host key generated from the host ID but also the session keys, and the drive key (equivalent) generated from the first drive ID and the session keys.

(A8) The contents key encrypted in step (A7) is transferred from the host unit 200 to the drive 100 (the function of the transfer section 262 of FIG. 1), and is written into the storage section 150 (key file 151) of the drive 100.

(A9) If it is discriminated in step (A6) that the second drive ID encrypted on the host unit 200 side and the encrypted second drive ID from the drive 100 are coincident with each other, then the encryption section 247 encrypts, concurrently to the processes in steps (A7) and (A8), contents data to be written into the drive 100 using the contents key.

(A10) The contents data encrypted in step (A9) is transferred from the host unit 200 to the drive 100 (the function of the transfer section 263 of FIG. 1), and is written into the storage section 150 (data file 152) of the drive 100.

(A11) If it is discriminated in step (A6) that the second drive ID encrypted on the host unit 200 side and the encrypted second drive ID from the drive 100 are not coincident with each other, then it is discriminated that the authentication of the drive 100 results in failure, and the processing is interrupted without executing the processes in steps (A7) to (A10).

When the contents data written in the storage section 150 of the drive 100 is read out from the drive 100 to the host unit 200, in the first embodiment, the contents data is read out by a procedure hereinafter described [steps (B1) to (B6)] after authentication of the drive 100 is performed in accordance with the steps (A1) to (A6) similar to those of the procedure described above. It is to be noted that, in FIGS. 4 and 5, reference characters (A1) to (A6) and (B1) to (B5) are entered as symbols at portions wherein processes corresponding to the steps (A1) to (A6) and (B1) to (B5) are executed, respectively. Here, since the drive authentication procedure in steps (A1) to (A6) is similar to the procedure described above, description of this procedure is omitted to avoid redundancy.

(B1) If it is discriminated in step (A6) that the second drive ID encrypted on the host unit 200 side and the encrypted second drive ID from the drive are coincident with each other, then it is discriminated that authentication of the drive results in success, and then the host unit 200 issues a request for readout of an encrypted contents key and encrypted contents data to the drive 100.

(B2) The drive 100 reads out the encrypted key and the encrypted contents data from the storage section 150 in response to the request in step (B1) and transfers them to the host unit 200 (the function of the transfer section 143 of FIG. 1).

(B3) In the host unit 200, the decryption sections 271 and 272 decrypt the encrypted contents key read out from the storage section 150 (key file 151) of the drive 100 using the host ID read out from the ROM 220 and the session keys and first drive ID stored in the RAM 210. In particular, the encrypted contents key is decrypted using the host key generated from the host ID and the session keys and the drive key (equivalent) generated from the first drive ID and the session keys.

(B4) Then, the decryption section 273 decrypts the encrypted contents data read out from the storage section 150 (data file 152) of the drive 100 using the contents key decrypted by the decryption sections 271 and 272.

(B5) If it is discriminated in step (A6) that the second drive ID encrypted on the host unit 200 side and the encrypted second drive ID from the drive are not coincident with each other, then it is discriminated that the authentication of the drive results in failure, and the processing is interrupted without executing the processes in steps (B1) to (B4) described above.

(B6) If a host unit different from the host unit 200 which has encrypted and written the contents key into the drive 100 tries to decrypt the contents key, then a host ID utilized for decryption in this instance is different from the host ID utilized for encryption. In such a case, since a correct contents key is not restored in step (B3), the encrypted contents data cannot be decrypted in step (B4). Consequently, the host unit 200 cannot obtain original contents data.

In this manner, in the data protection system as the first embodiment of the present invention, when the host unit 200 writes contents data and a contents key into the drive 100, since the contents key is encrypted with not only the identification information (first drive ID) of the drive 100 but also a factor of the host ID added thereto, only the original host unit 200 which has written the contents data and the contents key into the drive 100 can read out the contents data.

In particular, even if a host unit (such as a CPU) other than the original host unit 200 reads out the contents data from the drive 100, since identification information (host ID) of this host unit is different from that of the original host unit 200, correct decryption of the contents key is impossible. Consequently, the contents data cannot be correctly decrypted, and the contents data cannot be read out.

Accordingly, a form of dedicated connection wherein the host unit 200 and the drive 100 correspond in a one-to-one corresponding relationship to each other is implemented without increasing the load of processing on the drive 100 side by adopting unidirectional authentication by the CPPM, CPRM or the like, and the data of the drive 100 can be protected from illegal accessing. Consequently, not only illegal copying on the drive 100 side but also illegal readout and illegal copying of data by impersonation or the like on the host 200 side can be prevented with certainty, and reliable protection of the copyright can be anticipated.

[2] Description of the Second Embodiment

Figure 6:
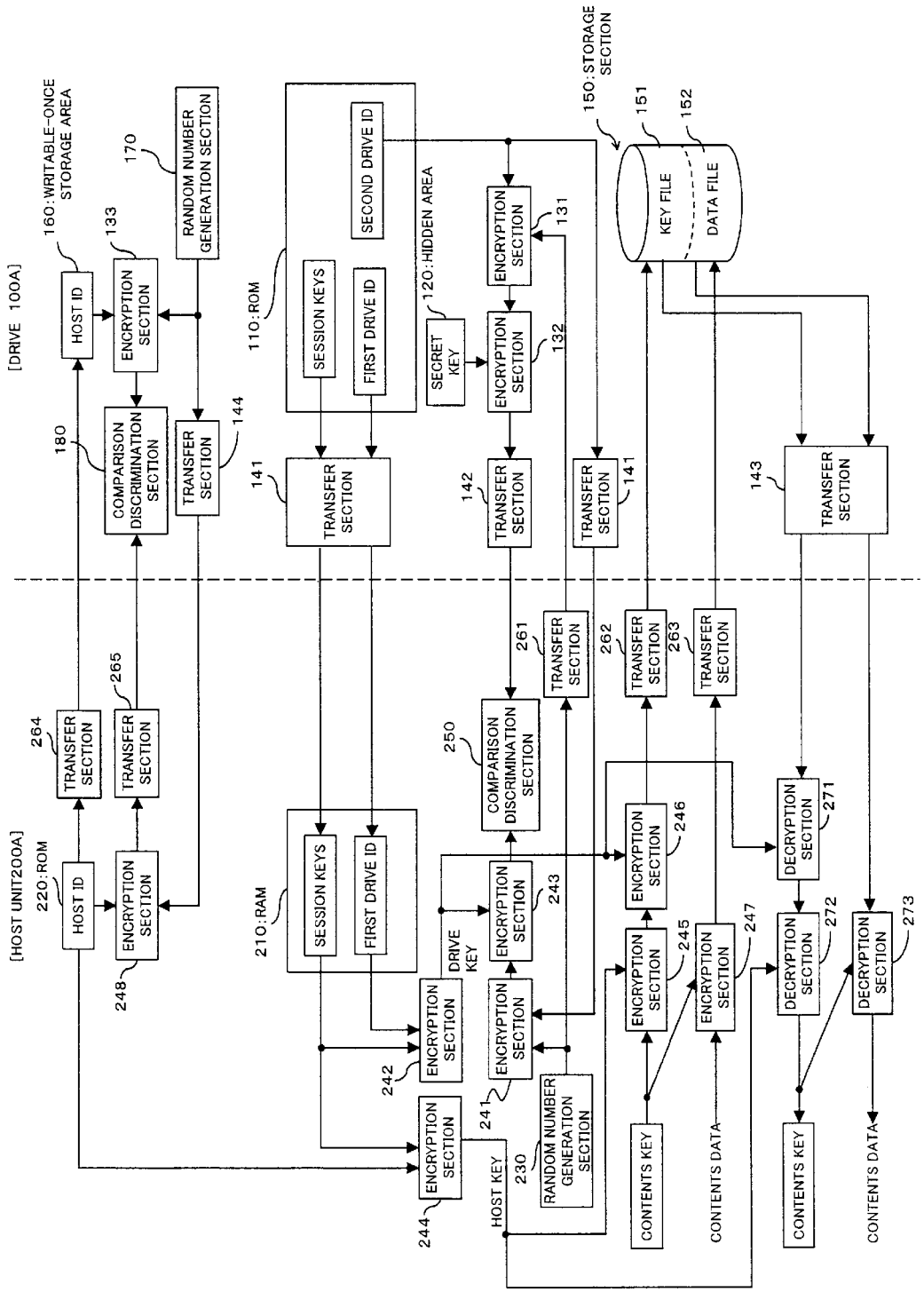
FIG. 6 is a block diagram showing a functional configuration of a data protection system (an access apparatus and a data recording apparatus) to which a data protection method as a second embodiment of the present invention is applied.

FIG. 6 is a block diagram showing a functional configuration of a data protection system (an access apparatus and a data recording apparatus) to which a data protection method as the second embodiment of the present invention is applied. While the data protection system of the second embodiment is configured substantially similarly to that of the first embodiment, as shown in FIG. 6, a drive (data recording apparatus) 100A of the data protection system in the second embodiment includes, in addition to the drive 100 of the first embodiment, an encryption section 133, a transfer section 144, a writable-once storage area 160, a random number generation section 170, and a comparison discrimination section 180. Further, a host unit (access apparatus) 200A of the data protection system in the second embodiment includes, in addition to the host unit 200 of the first embodiment, an encryption section 248, and a transfer sections 264 and 265. It is to be noted that, in FIG. 6, like reference characters to those of FIG. 1, 2 or 4 denote like elements to those described above, and overlapping description is omitted.

Here, in the drive 100A, the writable-once storage area 160 is an area into which a host ID of the host unit 200A, connected first to the drive 100A when the drive 100A is in an initial state, is written and into which data can be written only once.

The random number generation section (second random number generation means) 170 generates a random number every time it is accessed from the host unit 200A.

The transfer section (seventh transfer means) 144 transfers the random number generated by the random number generation section 170 to the host unit 200A.

The encryption section (fifth encryption means) 133 encrypts the host ID read out from the writable-once storage area 160 using the random number generated by the random number generation section 170.

The comparison discrimination section (second comparison discrimination means) 180 compares the host ID (encrypted by the encryption section 133) with an encrypted host ID (transferred thereto from the host unit 200A as hereinafter described), and discriminates whether or not they are coincident with each other.

In the host unit 200A, the encryption section (sixth encryption means) 248 encrypts the host ID stored in the ROM 220 using the random number transferred thereto from the drive 100A through the transfer section 144.

The transfer section (eighth transfer means) 264 reads out, in order to write the host ID into the writable-once storage area 160 when the host unit 200A is connected first to the drive 100A which is in an initial state, the host ID from the ROM 220 and transfers it to the drive 100A.

The transfer section (ninth transfer means) 265 transfers the host ID encrypted by the encryption section 248 to the drive 100A (comparison discrimination section 180) every time the host unit 200A accesses the drive 100A.

In the data protection system of the second embodiment, if both of the comparison discrimination sections 250 and 180 discriminate that the identification information is coincident when the host unit 200A records and stores the contents data into the drive 100A (storage section 150), then there is operation of the encryption sections 242 and 244 to 247 and the transfer sections 262 and 263. Further, if the comparison discrimination section 250 discriminates that the two second drive IDs are coincident with each other when the host unit 200A reads out the contents data from the drive 100A (storage section 150), then there is operation of the decryption sections 271 to 273, described hereinafter.

Also the functions as the encryption section 133, transfer section 144, random number generation section 170, and comparison discrimination section 180 which are newly added in the drive 100A of the second embodiment described above may be implemented by software for exclusive use. Similarly, the functions as the encryption section 248 and transfer sections 264 and 265 which are newly added in the host unit 200A of the second embodiment are implemented by software (an access program) for exclusive use.

It is to be noted that, in the drive 100A, the function of the transfer section 144 may be integrated with the functions the transfer sections 141 to 143 described in the first embodiment so that they areimplemented as one transfer section. Further, the function of the encryption section 133 may be integrated with the encryption sections 131 and 132 (described in the first embodiment) so that they are implemented as one encryption section.

Similarly, in the host unit 200A, the functions of the transfer sections 264 and 265 may be integrated with the functions of the transfer sections 261 to 263 (described in the first embodiment) so that they are implemented as one transfer section. Further, the function of the encryption section 248 may be integrated with the functions of the encryption sections 241 to 247 (described in the first embodiment) so that they are implemented as one encryption section.

Figure 7:
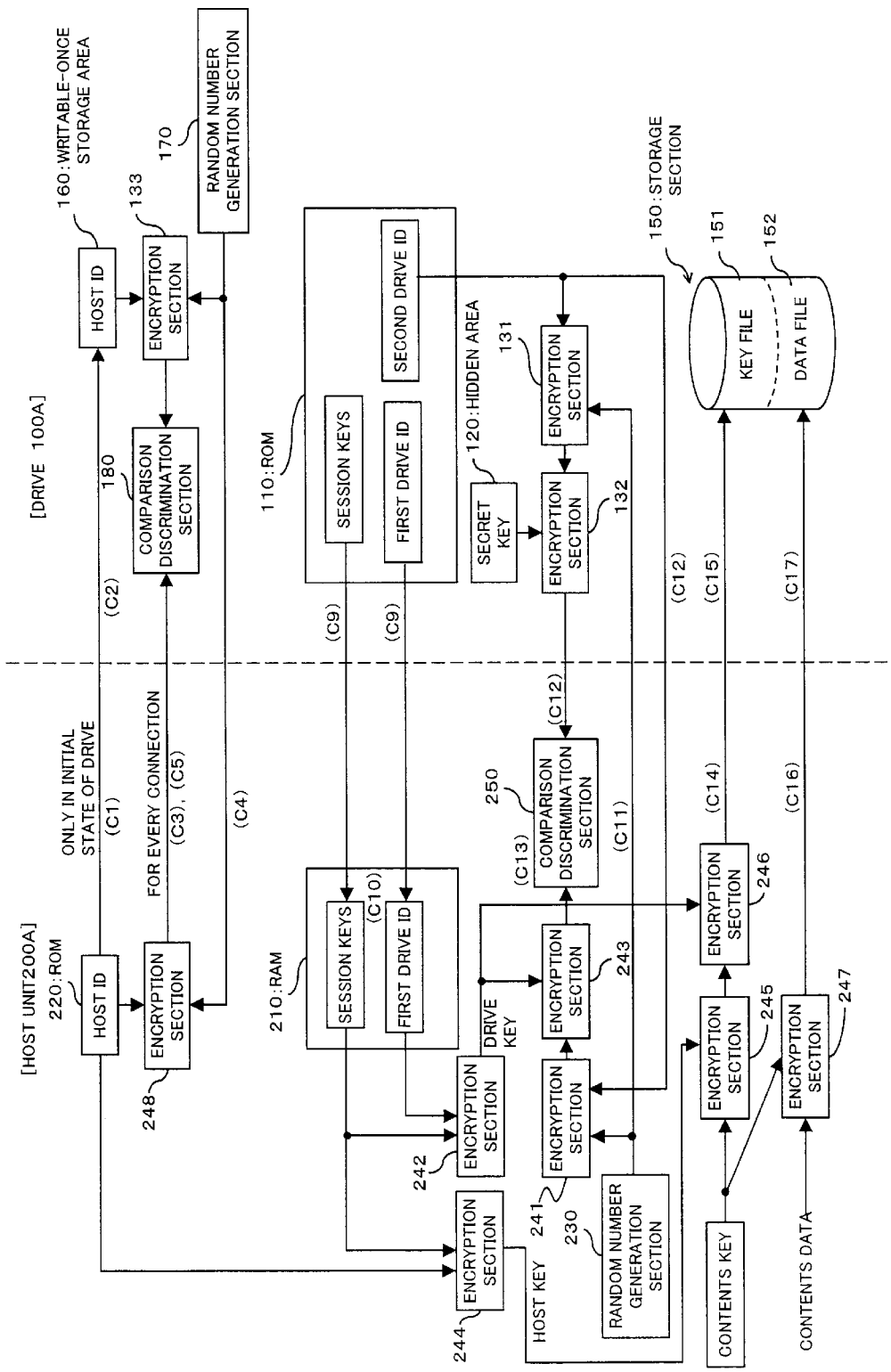
FIG. 7 is a block diagram illustrating contents data writing in the data protection system of the second embodiment.
Figure 8:
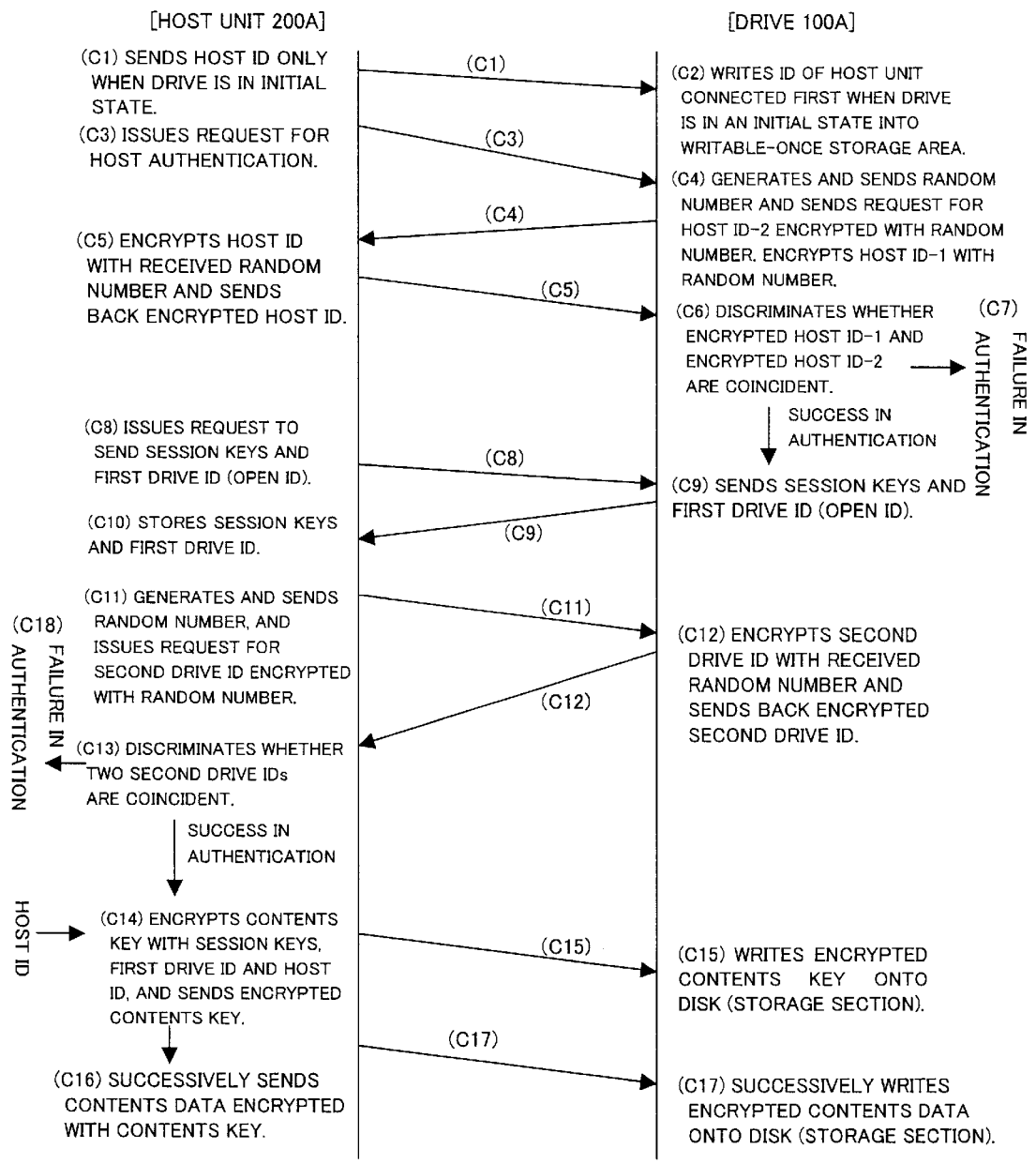
FIG. 8 is a diagrammatic view illustrating a contents data writing procedure in the second embodiment.
Figure 9:
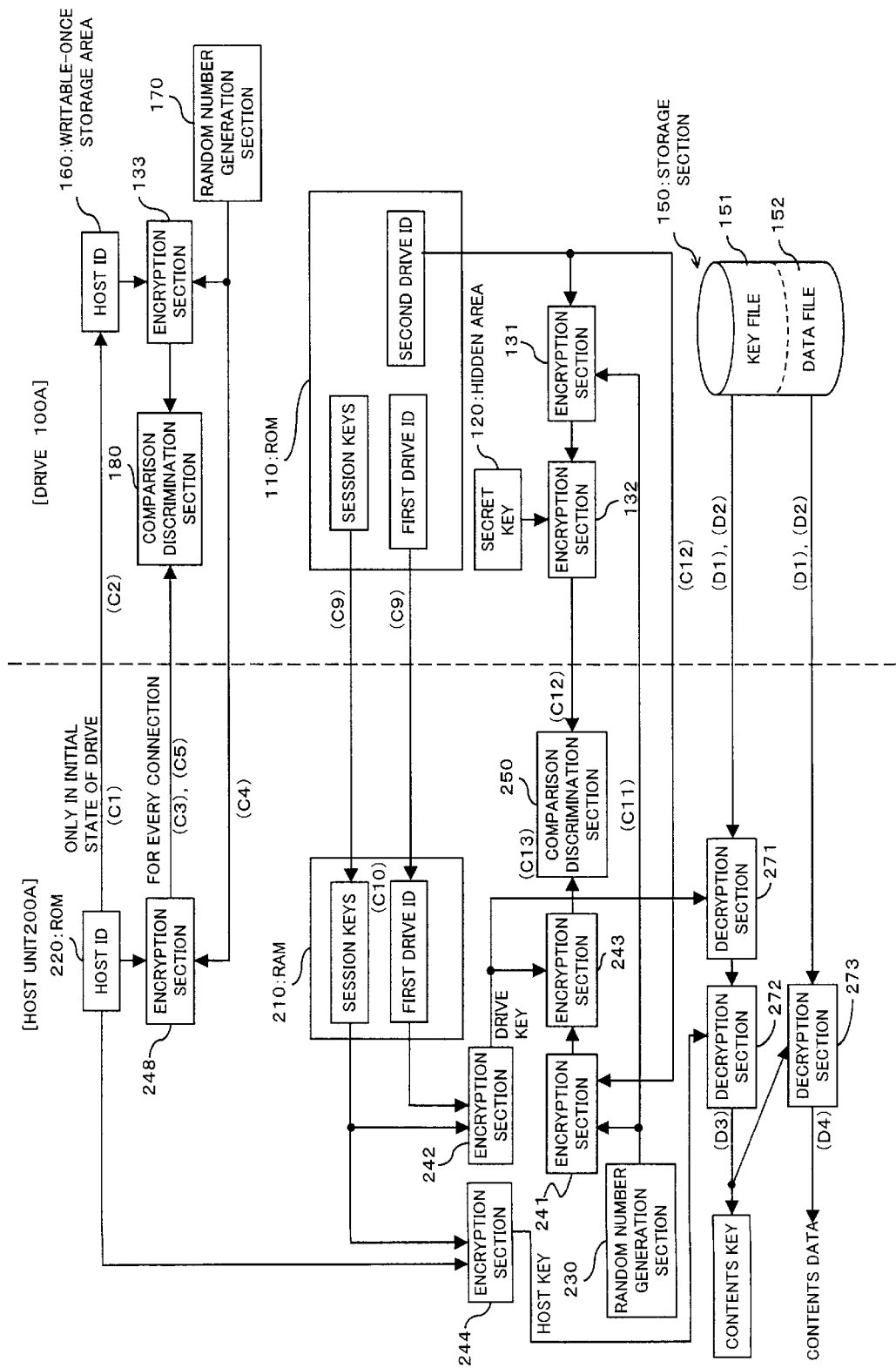
FIG. 9 is a block diagram showing contents data reading in the data protection system of the second embodiment.
Figure 10:
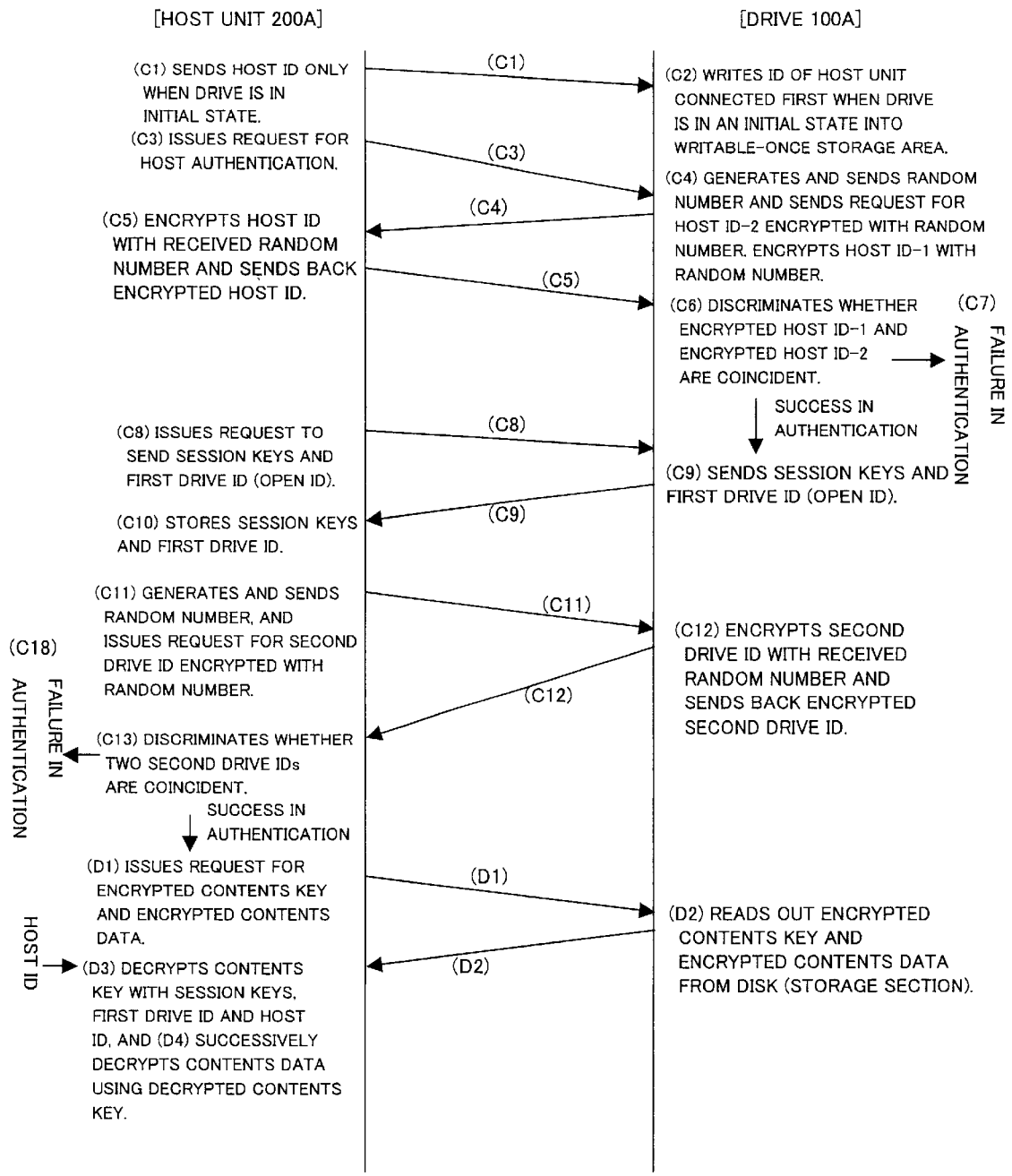
FIG. 10 is a diagrammatic view illustrating a contents data reading procedure in the second embodiment.

Now, operation of the data protection system of the second embodiment configured in such a manner as described above is described with reference to FIGS. 7 to 10. FIG. 7 is a block diagram showing components relating to contents data writing operation in the data protection system of the second embodiment. FIG. 8 is a diagrammatic view illustrating a contents data writing procedure in the second embodiment. FIG. 9 is a block diagram showing components relating to contents data reading operation in the data protection system of the second embodiment. FIG. 10 is a diagrammatic view illustrating a contents data reading procedure in the second embodiment.

In the second embodiment, while the host unit 200A accesses the drive 100A using a procedure similar to that of the first embodiment described above, authentication of the host unit 200A is executed by a procedure [steps (C1) to (C7)] described below on the drive 100A side prior to such accessing. Writing of the contents data from the host unit 200A into the drive 100A (storage section 150) is executed by a procedure [steps (C8) to (C18)] similar to that of the first embodiment after authentication of the host unit 200A is executed. It is to be noted that, in FIGS. 7 to 8, reference characters (C1) to (C18) are entered as symbols at points wherein processes corresponding to the steps (C1) to (C18) are executed.

(C1) The host unit 200A discriminates, upon accessing to the drive 100A, whether or not the drive 100A (writable-once storage area 160) is in an initial state wherein nothing is written therein. If it is discriminated that the writable-once storage area 160 is in an initial state, then the host ID is read out from the ROM 220 and transferred from the host unit 200A to the drive 100A (the function of the transfer section 264 of FIG. 6).

(C2) The host ID transferred from the host unit 200A to the drive 100A in step (C1) is written and stored into the writable-once storage area 160. The host ID written in the storage area 160 in this manner is hereinafter referred to as a host ID-1.

(C3) After the steps (C1) and (C2) described above are executed, orif it is discriminated that the drive 100A is not in an initial state in step (C1), the host unit 200A issues a request for host authentication to the drive 100A.

(C4) The drive 100A receives the request for host authentication from the host unit 200A and generates a random number by the random number generation section 170 and then transfers it to the host unit 200A (the function of the transfer section 144 of FIG. 6). Further, the drive 100A issues a request for transfer of the host ID encrypted with the random number to the host unit 200A. Further, the encryption section 133 encrypts the host ID-1 written in the storage area 160 using the random number generated by the random number generation section 170.

(C5) The encryption section 248 encrypts the host ID stored in the ROM 220 (this host ID is hereinafter referred to as host ID-2) using the random number from the drive 100A in response to the request in step (C4). Thereafter, the encrypted host ID-2 is transferred from the host unit 200A to the drive 100A (the function of the transfer section 265 of FIG. 6).

(C6) Then, the comparison discrimination section 180 of the drive 100A compares the host ID-1 (encrypted in step (C4)) with the encrypted host ID-2 (from the host unit 200A) to discriminate whether or not they are coincident with each other. In the second embodiment, after the host ID-1 is written into the storage area 160 of the drive 100A which is in an initial state in steps (C1) and (C2), host authentication is executed in the drive 100A based on the host ID-1 written in the storage area 160 every time the host unit 200A or any other host unit accesses the drive 100A.

(C7) If it is discriminated in step (C6) that the encrypted host ID-1 and the encrypted host ID-2 are not coincident, then it is discriminated that host authentication results in failure, and the processing is interrupted.

If it is discriminated in step (C6) that the encrypted host ID-1 and the encrypted host ID-2 are coincident, then it is discriminated that authentication of the host unit 200A results in success, and writing of the contents data is executed from the host unit 200A into the drive 100A (storage section 150) similarly as in the processing in the first embodiment. It is to be noted that steps (C8) to (C18) described below correspond to steps (A1) to (A11) of the first embodiment, respectively.

(C8) A request for transfer of the session keys (a plurality of media key blocks, and a plurality of secret keys) and first drive ID (static ID) stored in the ROM 110 area in the drive 100A is issued from the host unit 200A to the drive 100A.

(C9) In response to the request in step (C8), the session keys and the first drive ID are read out from the ROM 110 and transferred from the drive 100A to the host unit 200A (the function of the transfer section 141 of FIG. 6).

(C10) The session keys and first drive ID from the drive 100A are stored into the RAM 210 of the host unit 200A.

(C11) A random number is generated by the random number generation section 230 on the host unit 200A side and is transferred to the drive 100A (the function of the transfer section 261 of FIG. 6). At the same time, the host unit 200A issues a request for transfer of a raw second drive ID (dynamic ID) and the second drive ID encrypted with the random number just described to the drive 100A.

(C12) The encryption sections 131 and 132 encrypt the second drive ID using the random number from the host unit 200A and the drive key (secret key) written in the hidden area 120 in accordance with the request in step (C11). Then, the raw second drive ID and the encrypted second drive ID are transferred from the drive 100A to the host unit 200A (the functions of the transfer sections 141 and 142 of FIG. 6).

(C13) In the host unit 200A, the encryption section 242 produces a drive key (equivalent) based on the session keys and first drive ID stored in step (C10), and encrypts the raw second drive ID from the drive 100A using the drive key and the random number generated in step (C11). Thereafter, the comparison discrimination section 250 compares the second drive ID (encrypted on the host unit 200A side) with the encrypted second drive ID (from the drive 100A) to discriminate whether or not they are coincident with each other. In the second embodiment, authentication of the drive 100A is performed through steps (C8) to (C13) described above.

(C14) If it is discriminated in step (C13) that the second drive ID encrypted on the host unit 200A side and the encrypted second drive ID from the drive 100A are coincident with each other, then it is discriminated that the authentication of the drive 100A results in success, and the encryption sections 242 and 244 to 246 encrypt the contents key using the host ID read out from the ROM 220 and the session keys and first drive ID stored in the RAM 210. In particular, the contents key is encrypted with not only the host key generated from the host ID and the session keys but also the drive key (equivalent) generated from the first drive ID and the session keys.

(C15) The contents key encrypted in step (C14) is transferred from the host unit 200A to the drive 100A (the function of the transfer section 262 of FIG. 6) and is written into the storage section 150 (key file 151) of the drive 100A.

(C16) If it is discriminated in step (C13) that the second drive ID encrypted on the host unit 200A side and the encrypted second drive ID from the drive 100A are coincident with each other, then the encryption section 247 encrypts, concurrently to the processes in steps (C14) and (C15) described above, the contents data to be written into the drive 100A using the contents key.

(C17) The contents data encrypted in step (C16) is transferred from the host unit 200A to drive 100A (the function of the transfer section 263 of FIG. 6) and is written into the storage section 150 (data file 152) of the drive 100A.

(C18) If it is discriminated in step (C13) that the second drive ID encrypted on the host unit 200A side and the encrypted second drive ID from the drive 100A are not coincident with each other, then it is discriminated that the authentication of the drive 100A results in failure, and the processing is interrupted without executing the processes in steps (C14) to (C17) described above.

On the other hand, when the contents data written in the storage section 150 of the drive 100A as described above is read out from the drive 100A to the host unit 200A, in the second embodiment, authentication of the host unit 200A is executed on the drive 100A side in accordance with the steps (C1) to (C7) similar to those described above. Furthermore, after authentication of the drive 100A is executed on the host unit 200A side in accordance with the steps (C8) to (C13) similar to those described above, the contents data is read out by such a procedure [steps (D1) to (D5)] as described below.

It is to be noted that, in FIGS. 9 and 10, reference characters (C1) to (C13) and (D1) to (D4) are entered as symbols at portions wherein processes corresponding to steps (C1) to (C13) and (D1) to (D4) are executed, respectively. Here, since the host authentication procedure by steps (C1) to (C7) and the drive authentication procedure by steps (C8) to (C13) are similar to the processes described above, overlapping description of these procedures is omitted to avoid redundancy. It is to be noted that steps (D1) to (D5) described below correspond to the steps (B1) to (B5) in the first embodiment, respectively.

(D1) If it is discriminated in step (C13) that the second drive ID encrypted on the host unit 200A side and the encrypted second drive ID from the drive 100A are coincident with each other, then it is discriminated that the authentication of the drive 100A results in success, and the host unit 200A issues a request for readout of the encrypted contents key and the encrypted contents data to the drive 100A.

(D2) The drive 100A reads out the encrypted contents key and the encrypted contents data from the storage section 150 and transfers them to the host unit 200A in accordance with the request in step (D1) (the function of the transfer section 143 of FIG. 6).

(D3) In the host unit 200A, the decryption sections 271 and 272 decrypt the encrypted contents key read out from the storage section 150 (key file 151) of the drive 100A using the host ID read out from the ROM 220 and the session keys and first drive ID stored in the RAM 210. In particular, the encrypted contents key is decrypted using the host key generated from the host ID and the session keys and the drive key (equivalent) generated from the first drive ID and the session keys.

(D4) Then, the decryption section 273 decrypts the encrypted contents data read out from the storage section 150 (data file 152) of the drive 100A using the contents key decrypted by the decryption sections 271 and 272.

(D5) If it is discriminated in step (C13) that the second drive ID encrypted on the host unit 200A side and the encrypted second drive ID from the drive 100A are not coincident, then it is discriminated that the drive authentication results in failure, and the processing is interrupted without executing the processes in steps (D1) to (D4) described above.

In this manner, in the data protection system as the second embodiment of the present invention, the identification information (host ID-1) of the host unit 200A connected first to the drive 100A when the drive 100A is in an initial state is written into the writable-once storage area 160 in the drive 100A. Thereafter, it is authenticated whether or not a host unit 200A, which has accessed the drive 100A, is the host unit 200A connected first to the drive 100A (original host) is executed, based on the host ID-1 written in the storage area 160. Then, only if it is authenticated that the host unit 200A is the original host unit 200A, then accessing (data writing/readout) to the drive 100A is authorized.

Consequently, if a very simple authentication process is executed on the drive 100A side, then a host unit other than the original host unit 200A cannot access the drive 100A. Accordingly, the data of the drive 100A can be protected from illegal accessing without increasing the load of processing on the drive 100A side, and not only illegal copying on the drive 100A side but also illegal readout and illegal copying of data by impersonation or the like on the host 200A side can be prevented with certainty, and reliable protection of copyright can be anticipated.

Further, since only the original host unit 200A connected first to the drive 100A can access the drive 100A, such illegal diversion of the drive 100A that, for example, a hard disk drive (data recording apparatus) is dismounted from a set top box (STB) and diverted in a system other than the STB can be prevented with certainty.

It is to be noted that, in the data protection system of the second embodiment, also the technique described in the first embodiment (that is, the technique wherein the contents key to be written into the drive 100A is encrypted with the first drive ID and the host ID) is incorporated. Consequently, even if some measures are used to illegally pass the host authentication, a host unit other than the original host unit 200A cannot decrypt the contents key read out from the drive 100A and cannot read out the contents data. Accordingly, illegal readout and illegal copying of data by impersonation or the like on the host unit 200A can be prevented with more certainty.

[3] Others

The present invention is not limited to the embodiment specifically described above, and variations and modifications can be made without departing from the scope of the present invention.

For example, although the data protection system of the second embodiment described above, combines the technique of host authentication on the drive 100A side for every access with the technique described in the first embodiment, it is also possible that the technique of host authentication on the drive 100A side for every access may be combined with an ordinary CPRM or CPPM. In particular, after steps (C1) to (C7) are executed, steps (a1) to (a8), (b1) and (b2) may be executed in place of steps (C8) to (C18) and (D1) to (D5) in the second embodiment. Also in this case, effects similar to those of the second embodiment can be obtained.

Further, the drive authentication methods in the first embodiment and the second embodiment are not limited to the methods which use steps (A1) to (A6) and (C8) to (C13) described above. Similarly, also the host authentication method in the second embodiment is not limited to the method which use steps (C1) to (C7) described above.

What is claimed is:

1. A data protection method for protecting, when data transfer is performed between a data recording apparatus for recording and storing data and an access apparatus which accesses said data recording apparatus, data of said data recording apparatus from illegal accessing, comprising:

executing, by said access apparatus, authentication of said data recording apparatus;

encrypting, when said data recording apparatus is authenticated, a contents key with access apparatus identification information registered in advance in a storage area of said access apparatus and a session key and first identification information read out from a storage area of said data recording apparatus;

transferring the encrypted contents key from said access apparatus to said data recording apparatus in order to write the encrypted contents key into said data recording apparatus;

encrypting, by said access apparatus, contents data to be recorded and stored into said data recording apparatus with the contents key; and transferring the encrypted contents data from said access apparatus to said data recording apparatus in order to write the encrypted contents data into said data recording apparatus.

2. The data protection method as claimed in claim 1, wherein the executing authentication of said data recording apparatus includes:

transferring the session key and the first identification information registered in advance in the storage area of said data recording apparatus from said data recording apparatus to said access apparatus;

generating, by said access apparatus, a random number;

transferring the random number from said access apparatus to said data recording apparatus;

transferring second identification information registered in advance in the storage area of said data recording apparatus from said data recording apparatus to said access apparatus;

encrypting, by said data recording apparatus, the second identification information with the random number from said access apparatus and a secret key of said data recording apparatus;

transferring the encrypted second identification information from said data recording apparatus to said access apparatus;

encrypting, by said access apparatus, the second identification information with the random number, session key and first identification information; and comparing the encrypted second identification information from said data recording apparatus and the second identification information encrypted by said access apparatus with each other to discriminate whether or not the encrypted second identification information and the second identification information encrypted by said access apparatus coincide with each other;

said data recording apparatus being authenticated when it is discriminated that the encrypted second identification information and the second identification information encrypted by said access apparatus coincide with each other.

3. A data protection method for protecting, when data transfer is performed between a data recording apparatus for recording and storing data and an access apparatus which accesses said data recording apparatus, data of said data recording apparatus from illegal accessing, comprising:

writing contents data encrypted with a contents key into said data recording apparatus and writing the contents key, which is encrypted with predetermined access apparatus identification information and a session key and first identification information registered in advance in a storage area of said data recording apparatus, into said data recording apparatus;

executing, by said access apparatus, authentication of said data recording apparatus;

reading out, when said data recording apparatus is authenticated, the encrypted contents data and the encrypted contents key from said data recording apparatus and transferring the encrypted contents data and the encrypted contents key to said access apparatus;

decrypting, by said access apparatus, the encrypted contents key with the access apparatus identification information registered in advance in a storage area of said access apparatus and the session key and first identification information read out from the storage area of said data recording apparatus; and decrypting the encrypted contents data with the decrypted contents key.

4. The data protection method as claimed in claim 3, wherein the executing authentication of said data recording apparatus includes:

transferring the session key and the first identification information registered in advance in the storage area of said data recording apparatus from said data recording apparatus to said access apparatus;

generating, by said access apparatus, a random number;

transferring the random number from said access apparatus to said data recording apparatus;

transferring second identification information registered in advance in the storage area of said data recording apparatus from said data recording apparatus to said access apparatus;

encrypting, by said data recording apparatus, the second identification information with the random number from said access apparatus and a secret key of said data recording apparatus;

transferring the encrypted second identification information from said data recording apparatus to said access apparatus;

encrypting, by said access apparatus, the second identification information with the random number, session key and first identification information; and comparing the encrypted second identification information from said data recording apparatus and the second identification information encrypted by said access apparatus with each other to discriminate whether or not the encrypted second identification information and the second identification information encrypted by said access apparatus coincide with each other;

said data recording apparatus being authenticated when it is discriminated that the encrypted second identification information and the second identification information encrypted by said access apparatus coincide with each other.

5. A data protection system for protecting, when data transfer is performed between a data recording apparatus for recording and storing data and an access apparatus which accesses said data recording apparatus, data of said data recording apparatus from illegal accessing, comprising:

a first storage area provided in said data recording apparatus storing a session key, first identification information and second identification information;

a first transfer unit provided in said data recording apparatus and reading out and transferring at least one of the session key, first identification information and second identification information from said first storage area to said access apparatus in response to a request from said access apparatus;

a first encryption unit provided in said data recording apparatus and encrypting, in response to a request from said access apparatus, the second identification information with a random number sent from said access apparatus together with the request and a secret key of said data recording apparatus;

a second transfer unit provided in said data recording apparatus and transferring the second identification information encrypted by said first encryption unit to said access apparatus;

a storage section provided in said data recording apparatus and storing contents data and a contents key from said access apparatus when the contents data and the contents key are written;

a second storage area provided in said access apparatus and storing access apparatus identification information of said access apparatus;

a first random number generation unit provided in said access apparatus and generating the random number;

a fourth transfer unit provided in said access apparatus and transferring the random number generated by said first random number generation unit to said data recording apparatus;

a second encryption unit provided in said access apparatus and encrypting the second identification information read out from said first storage area of said data recording apparatus with the random number generated by said first random number generation unit and the session key and first identification information read out from said first storage area of said data recording apparatus;

a first comparison discrimination unit provided in said access apparatus and comparing the encrypted second identification information from said data recording apparatus and the second identification information encrypted by said second encryption unit with each other to discriminate whether or not the encrypted second identification information and the second identification information encrypted by said second encryption unit coincide with each other;

a third encryption unit provided in said access apparatus and encrypting, when said first comparison discrimination unit discriminates that the encrypted second identification information and the second identification information encrypted by said second encryption unit coincide with each other, the contents key with the access apparatus identification information read out from said second storage area and the session key and first identification information;

a fifth transfer unit provided in said access apparatus and transferring the contents key encrypted by said third encryption unit to said data recording apparatus so as to be written into said storage section of said data recording apparatus;

a fourth encryption unit provided in said access apparatus and encrypting contents data to be recorded and stored into said data recording apparatus with the contents key; and a sixth transfer unit provided in said access apparatus and transferring the contents data encrypted by said fourth encryption unit to said data recording apparatus so as to be written into said storage section of said data recording apparatus.

6. The data protection system as claimed in claim 5, wherein said data recording apparatus further includes:

a writable-once recording area into which access apparatus identification information of said access apparatus connected first to said data recording apparatus when said data recording apparatus is in an initial state;

a second random number generation unit generating a random number every time said data recording apparatus is accessed by said access apparatus;

a seventh transfer unit transferring the random number generated by said second random number generation unit to said access apparatus;

a fifth encryption unit encrypting the access apparatus identification information read out from said writable-once storage area with the random number generated by said second random number generation means; and a second comparison discrimination unit comparing the access apparatus identification information encrypted by said fifth encryption unit and the access apparatus identification information from said access apparatus encrypted with the random number with each other to discriminate whether or not the access apparatus identification information encrypted by said fifth encryption unit and the access apparatus identification from said access apparatus coincide with each other, and said access apparatus further includes:

an eighth transfer unit reading out and transferring, when said access apparatus is connected first to said data recording apparatus in an initial state, the access apparatus identification information from said second storage area to said data recording apparatus;

a sixth encryption unit encrypting the access apparatus identification information with the random number sent from said data recording apparatus; and a ninth transfer unit transferring the access apparatus identification information encrypted by said sixth encryption unit to said data recording apparatus every time said access apparatus accesses said data recording apparatus;

said third encryption means, fifth transfer means, fourth encryption unit and sixth transfer unit operating when both of said first comparison discrimination unit and said second comparison discrimination unit discriminate coincidence of the pertaining identification information and contents data is to be recorded and stored into said data recording apparatus.

7. The data protection system as claimed in claim 6, wherein said data recording apparatus further includes a third transfer unit reading out and transferring, in response to a request from said access apparatus, the encrypted contents data and the encrypted contents key from said storage section to said access apparatus, and said access apparatus further includes:

a first decryption unit decrypting, when both of said first comparison discrimination unit and said second comparison discrimination unit discriminate coincidence of the pertaining identification information and contents data is to be read out from said data recording apparatus, the encrypted contents key read out from said storage section of said data recording apparatus with the access apparatus identification information read out from said second storage area and the session key and first identification information; and a second decryption unit decrypting the encrypted contents data read out from said storage section of said data recording apparatus with the contents key decrypted by said first decryption means.

8. A data protection system for protecting, when data transfer is performed between a data recording apparatus for recording and storing data and an access apparatus which accesses said data recording apparatus, data of said data recording apparatus from illegal accessing, comprising:

a first storage area provided in said data recording apparatus and storing a session key, first identification information and second identification information;

a first transfer unit provided in said data recording apparatus and reading out and transferring at least one of the session key, first identification information and second identification information from said first storage area to said access apparatus in response to a request from said access apparatus;

a first encryption unit provided in said data recording apparatus and encrypting, in response to a request from said access apparatus, the second identification information with a random number sent from said access apparatus together with the request and a secret key of said data recording apparatus;

a second transfer unit provided in said data recording apparatus and transferring the second identification information encrypted by said first encryption unit to said access apparatus;

a storage section provided in said data recording apparatus and storing contents data encrypted with a contents key and the contents key encrypted with the session key and first identification information after written therein in advance;

a third transfer unit provided in said data recording apparatus and reading out and transferring the encrypted contents data and the encrypted contents key from said storage section to said access apparatus in response to a request from said access apparatus;

a second storage area provided in said access apparatus and storing access apparatus identification information of said access apparatus;

a first random number generation unit provided in said access apparatus and generating the random number;

a fourth transfer unit provided in said access apparatus and transferring the random number generated by said first random number generation unit to said data recording apparatus;

a second encryption unit provided in said access apparatus and encrypting the second identification information read out from said first storage area of said data recording apparatus with the random number generated by said first random number generation unit and the session key and first identification information read out from said first storage area of said data recording apparatus;

a first comparison discrimination unit provided in said access apparatus and comparing the encrypted second identification information from said data recording apparatus and the second identification information encrypted by said second encryption unit with each other to discriminate whether or not the encrypted second identification information and the second identification information encrypted by said second encryption unit coincide with each other;

a first decryption unit provided in said access apparatus and decrypting, when said first comparison discrimination unit discriminates that the encrypted second identification information and the second identification information encrypted by said second encryption unit coincide with each other, the encrypted contents key read out from said storage section of said data recording apparatus with the access apparatus identification information read out from said second storage area and the session key and first identification information; and a second decryption unit provided in said access apparatus and decrypting the encrypted contents data read out from said storage section of said data recording apparatus with the contents key decrypted by said first decryption means.

9. An access apparatus for accessing a data recording apparatus which includes a first storage area for storing a session key, first identification information and second identification information, a first transfer unit reading out and transferring, in response to a request from an external apparatus, at least one of the session key, first identification information and second identification information from said first storage area to the external apparatus of the source of the request, a first encryption unit encrypting, in response to the request from the external apparatus, the second identification information with a random number sent to said data recording apparatus together with the request and a secret key of said data recording apparatus, a second transfer unit transferring the second identification information encrypted by said first encryption unit to the external apparatus of the source of the request, and a storage section storing contents data and a contents key from said access apparatus when the contents data and the contents key are written, said access apparatus comprising:

- a second storage area storing access apparatus identification information of said access apparatus;
- a first random number generation unit generating the random number;
- a fourth transfer unit transferring the random number generated by said first random number generation unit to said data recording apparatus;
- a second encryption unit encrypting the second identification information read out from said first storage area of said data recording apparatus with the random number generated by said first random number generation unit and the session key and first identification information read out from said first storage area of said data recording apparatus;
- a first comparison discrimination unit comparing the encrypted second identification information from said data recording apparatus and the second identification information encrypted by said second encryption unit with each other to discriminate whether or not the encrypted second identification information and the second identification information encrypted by said second encryption unit coincide with each other;
- a third encryption unit encrypting, when said first comparison discrimination unit discriminates that the encrypted second identification information and the second identification information encrypted by said second encryption unit coincide with each other, the contents key with the access apparatus identification information read out from said second storage area and the session key and first identification information;
- a fifth transfer unit transferring the contents key encrypted by said third encryption unit to said data recording apparatus so as to be written into said storage section of said data recording apparatus;
- a fourth encryption unit encrypting contents data to be recorded and stored into said data recording apparatus with the contents key; and
- a sixth transfer unit transferring the contents data encrypted by said fourth encryption unit to said data recording apparatus so as to be written into said storage section of said data recording apparatus.

10. An access apparatus for accessing a data recording apparatus which includes a first storage area for storing a session key, first identification information and second identification information, a first transfer unit reading out and transferring, in response to a request from an external apparatus, at least one of the session key, first identification information and second identification information from said first storage area to the external apparatus of the source of the request, a first encryption unit encrypting, in response to the request from the external apparatus, the second identification information with a random number sent to said data recording apparatus together with the request and a secret key of said data recording apparatus, a second transfer unit transferring the second identification information encrypted by said first encryption unit to the external apparatus of the source of the request, a storage section storing contents data encrypted with a contents key after written therein and storing the contents key encrypted with predetermined access apparatus identification information and the session key and first identification information after written therein, and a third transfer unit reading out and transferring the encrypted contents data and the encrypted contents key from said storage section to the external apparatus of the source of the request in response to the request from the external apparatus, said access apparatus comprising:

- a second storage area storing access apparatus identification information of said access apparatus;
- a first random number generation unit generating the random number;
- a fourth transfer unit transferring the random number generated by said first random number generation unit to said data recording apparatus;
- a second encryption unit encrypting the second identification information read out from said first storage area of said data recording apparatus with the random number generated by said first random number generation unit and the session key and first identification information read out from said first storage area of said data recording apparatus;
- a first comparison discrimination unit comparing the encrypted second identification information from said data recording apparatus and the second identification information encrypted by said second encryption unit with each other to discriminate whether or not the encrypted second identification information and the second identification information encrypted by said second encryption unit coincide with each other;
- a first decryption unit decrypting, when said first comparison discrimination unit discriminates that the encrypted second identification information and the second identification information encrypted by said second encryption unit coincide with each other, the encrypted contents key read out from said storage section of said data recording apparatus with the access apparatus identification information read out from said second storage area and the session key and first identification information; and
- a second decryption unit decrypting the encrypted contents data read out from said storage section of said data recording apparatus with the contents key decrypted by said first decryption means.

11. An access apparatus for accessing a data recording apparatus which includes a first storage area for storing a session key, first identification information and second identification information, a first transfer unit reading out and transferring, in response to a request from an external apparatus, at least one of the session key, first identification information and second identification information from said first storage area to the external apparatus of the source of the request, a first encryption unit encrypting, in response to the request from the external apparatus, the second identification information with a random number sent to said data recording apparatus together with the request and a secret key of said data recording apparatus, a second transfer unit transferring the second identification information encrypted by said first encryption unit to the external apparatus of the source of the request, a storage section storing contents data encrypted with a contents key after written therein and storing the contents key encrypted with predetermined access apparatus identification information and the session key and first identification information after written therein, and a third transfer unit reading out and transferring the encrypted contents data and the encrypted contents key from said storage section to the external apparatus of the source of the request in response to the request from the external apparatus, said access apparatus comprising:

a second storage area storing access apparatus identification information of said access apparatus;

a first random number generation unit generating the random number;

a fourth transfer unit transferring the random number generated by said first random number generation unit to said data recording apparatus;

a second encryption unit encrypting the second identification information read out from said first storage area of said data recording apparatus with the random number generated by said first random number generation unit and the session key and first identification information read out from said first storage area of said data recording apparatus;

a first comparison discrimination unit comparing the encrypted second identification information from said data recording apparatus and the second identification information encrypted by said second encryption unit with each other to discriminate whether or not the encrypted second identification information and the second identification information encrypted by said second encryption unit coincide with each other;

a third encryption unit encrypting, when said first comparison discrimination unit discriminates that the encrypted second identification information and the second identification information encrypted by said second encryption unit coincide with each other and contents data is to be recorded and stored into said data recording apparatus, the contents key with the access apparatus identification information read out from said second storage area and the session key and first identification information;

a fifth transfer unit transferring the contents key encrypted by said third encryption unit to said data recording apparatus so as to be written into said storage section of said data recording apparatus;

a fourth encryption unit encrypting the contents data to be recorded and stored into said data recording apparatus with the contents key;

a sixth transfer unit transferring the contents data encrypted by said fourth encryption unit to said data recording apparatus so as to be written into said storage section of said data recording apparatus;

a first decryption unit decrypting, when said first comparison discrimination unit discriminates that the encrypted second identification information and the second identification information encrypted by said second encryption unit coincide with each other and contents data is to be read out from said data recording apparatus, the encrypted contents key read out from said storage section of said data recording apparatus with the access apparatus identification information read out from said second storage area and the session key and first identification information; and a second decryption unit decrypting the encrypted contents data read out from said storage section of said data recording apparatus with the contents key decrypted by said first decryption means.

12. A computer-readable recording medium on which an access program is recorded for causing a computer to function as an access apparatus accessing a data recording apparatus which includes a first storage area storing a session key, first identification information and second identification information, first transfer unit reading out and transferring, in response to a request from an external apparatus, at least one of the session key, first identification information and second identification information from said first storage area to the external apparatus of the source of the request, a first encryption unit encrypting, in response to the request from the external apparatus, the second identification information with a random number sent to said data recording apparatus together with the request and a secret key of said data recording apparatus, a second transfer unit transferring the second identification information encrypted by said first encryption unit to the external apparatus of the source of the request, and a storage section storing contents data and a contents key from said access apparatus when the contents data and the contents key are written, said access program causing said computer to function as:

a first random number generation unit generating the random number;

a fourth transfer unit transferring the random number generated by said first random number generation unit to said data recording apparatus;

a second encryption unit encrypting the second identification information read out from said first storage area of said data recording apparatus with the random number generated by said first random number generation unit and the session key and first identification information read out from said first storage area of said data recording apparatus;

a first comparison discrimination unit comparing the encrypted second identification information from said data recording apparatus and the second identification information encrypted by said second encryption unit with each other to discriminate whether or not the encrypted second identification information and the second identification information encrypted by said second encryption unit coincide with each other;

a third encryption unit encrypting, when said first comparison discrimination unit discriminates that the encrypted second identification information and the second identification information encrypted by said second encryption unit coincide with each other, the contents key with access apparatus identification information of said access apparatus and the session key and first identification information;

a fifth transfer unit transferring the contents key encrypted by said third encryption unit to said data recording apparatus so as to be written into said storage section of said data recording apparatus;

a fourth encryption unit encrypting contents data to be recorded and stored into said data recording apparatus with the contents key; and a sixth transfer unit transferring the contents data encrypted by said fourth encryption unit to said data recording apparatus so as to be written into said storage section of said data recording apparatus.

13. A computer-readable recording medium on which an access program is recorded for causing a computer to function as an access apparatus for accessing a data recording apparatus which includes a first storage area storing a session key, first identification information and second identification information, first transfer unit reading out and transferring, in response to a request from an external apparatus, at least one of the session key, first identification information and second identification information from said first storage area to the external apparatus of the source of the request, first encryption unit encrypting, in response to the request from the external apparatus, the second identification information with a random number sent to said data recording apparatus together with the request and a secret key of said data recording apparatus, second transfer unit transferring the second identification information encrypted by said first encryption unit to the external apparatus of the source of the request, a storage section storing contents data encrypted with a contents key after written therein and storing the contents key encrypted with predetermined access apparatus identification information and the session key and first identification information after written therein, and third transfer unit reading out and transferring the encrypted contents data and the encrypted contents key from said storage section to the external apparatus of the source of the request in response to the request from the external apparatus, said access program causing said computer to function as:

- a first random number generation unit generating the random number;
- a fourth transfer unit transferring the random number generated by said first random number generation unit to said data recording apparatus;
- a second encryption unit encrypting the second identification information read out from said first storage area of said data recording apparatus with the random number generated by said first random number generation unit and the session key and first identification information read out from said first storage area of said data recording apparatus;
- a first comparison discrimination unit comparing the encrypted second identification information from said data recording apparatus and the second identification information encrypted by said second encryption unit with each other to discriminate whether or not the encrypted second identification information and the second identification information encrypted by said second encryption unit coincide with each other;
- a first decryption unit decrypting, when said first comparison discrimination unit discriminates that the encrypted second identification information and the second identification information encrypted by said second encryption unit coincide with each other, the encrypted contents key read out from said storage section of said data recording apparatus with the access apparatus identification information of said access apparatus and the session key and first identification information; and
- a second decryption unit decrypting the encrypted contents data read out from said storage section of said data recording apparatus with the contents key decrypted by said first decryption means.

14. A data protection method for protecting, when data transfer is performed between a data recording apparatus for recording and storing data and an access apparatus which accesses said data recording apparatus, data of said data recording apparatus from illegal accessing, comprising:

- transferring access apparatus identification information, which is registered in advance in a storage area of said access apparatus connected first to said data recording apparatus when said data recording apparatus is in an initial state, from said access apparatus to said data recording apparatus and writing the access apparatus identification information into a writable-once storage area;
- performing, by said data recording apparatus, every time said access apparatus thereafter accesses said data recording apparatus, authentication of said access apparatus based on the access apparatus identification information written in said writable-once storage area;
- performing, by said access apparatus, authentication of said data recording apparatus when said access apparatus is authenticated;
- encrypting, when said data recording apparatus is authenticated and contents data is to be recorded and stored into said data recording apparatus, a contents key with a session key and first identification information read out from said storage area of said data recording apparatus;
- transferring the encrypted contents key from said access apparatus to said data recording apparatus in order to write the encrypted contents key into said data recording apparatus;
- encrypting, by said access apparatus, the contents data to be recorded and stored into said data recording apparatus with the contents key; and
- transferring the encrypted contents data from said access apparatus to said data recording apparatus in order to write the encrypted contents data into said recording apparatus.

15. The data protection method as claimed in claim 14, further comprising:

- reading out and transferring, when both of said access apparatus and said data recording apparatus are authenticated and contents data is to be read out from said data recording apparatus, the encrypted contents data and the encrypted contents key from said data recording apparatus to said access apparatus;
- decrypting, by said access apparatus, the encrypted contents key with the session key and first identification information read out from said storage area of said data recording apparatus; and
- decrypting the encrypted contents data with the decrypted contents key.

16. The data protection method as claimed in claim 14, wherein the performing authentication of said access apparatus includes:

- generating, by said data recording apparatus, a random number;
- transferring the random number from said data recording apparatus to said access apparatus;
- encrypting, by said data recording apparatus, the access apparatus identification information with the random number;
- encrypting, by said access apparatus, the access apparatus identification information with the random number from said data recording apparatus;
- transferring the encrypted access apparatus identification information from said access apparatus to said data recording apparatus; and
- comparing the encrypted access apparatus identification information from said access apparatus and the access apparatus identification information encrypted by said data recording apparatus with each other to discriminate whether or not the encrypted access apparatus identification information and the access apparatus identification information encrypted by said data recording apparatus coincide with each other;

said access apparatus being authenticated when it is discriminated that the encrypted access apparatus identification information and the access apparatus identification information encrypted by said data recording apparatus coincide with each other.

17. The data protection method as claimed in claim 14, wherein the executing authentication of said data recording apparatus includes:

transferring the session key and the first identification information registered in advance in the storage area of said data recording apparatus from said data recording apparatus to said access apparatus;

generating, by said access apparatus, a random number;

transferring the random number from said access apparatus to said data recording apparatus;

transferring second identification information registered in advance in the storage area of said data recording apparatus from said data recording apparatus to said access apparatus;

encrypting, by said data recording apparatus, the second identification information with the random number from said access apparatus and a secret key of said data recording apparatus;

transferring the encrypted second identification information from said data recording apparatus to said access apparatus;

encrypting, by said access apparatus, the second identification information with the random number, session key and first identification information; and comparing the encrypted second identification information from said data recording apparatus and the second identification information encrypted by said access apparatus with each other to discriminate whether or not the encrypted second identification information and the second identification information encrypted by said access apparatus coincide with each other;

said data recording apparatus being authenticated when it is discriminated that the encrypted second identification information and the second identification with each other.

18. A data protection method for protecting, when data transfer is performed between a data recording apparatus for recording and storing data and an access apparatus which accesses said data recording apparatus, data of said data recording apparatus from illegal accessing, comprising:

transferring access apparatus identification information, which is registered in advance in a storage area of said access apparatus connected first to said data recording apparatus when said data recording apparatus is in an initial state, from said access apparatus to said data recording apparatus and writing the access apparatus identification information into a writable-once storage area;

performing, by said data recording apparatus, every time said access apparatus thereafter accesses said data recording apparatus, authentication of said access apparatus based on the access apparatus identification information written in said writable-once storage area;

performing, by said access apparatus, authentication of said data recording apparatus when said access apparatus is authenticated;

encrypting, when said data recording apparatus is authenticated and contents data is to be recorded and stored into said data recording apparatus, a contents key with access apparatus identification information registered in advance in said storage are of said access apparatus and a session key and first identification information read out from said storage area of said data recording apparatus;

transferring the encrypted contents key from said access apparatus to said data recording apparatus in order to write the encrypted contents key into said data recording apparatus;

encrypting, by said access apparatus, the contents data to be recorded and stored into said data recording apparatus with the contents key; and transferring the encrypted contents data from said access apparatus to said data recording apparatus in order to write the encrypted contents data into said recording apparatus.

19. The data protection method as claimed in claim 18, further comprising:

reading out and transferring, when both of said access apparatus and said data recording apparatus are authenticated and contents data is to be read out from said data recording apparatus, the encrypted contents data and the encrypted contents key from said data recording apparatus to said access apparatus;

decrypting, by said access apparatus, the encrypted contents key with the access apparatus identification information registered in advance in said storage area of said access apparatus and the session key and first identification information read out from said storage area of said data recording apparatus; and decrypting the encrypted contents data with the decrypted contents key.

20. A data recording apparatus for recording and storing data and performing writing/reading out of the data in response to an access from an access apparatus, comprising:

a writable-once recording area into which access apparatus identification information of said access apparatus connected first to said data recording apparatus when said data recording apparatus is in an initial state;

a second random number generation unit generating a random number every time said data recording apparatus is accessed by said access apparatus;

a seventh transfer unit transferring the random number generated by said second random number generation unit to said access apparatus;

a fifth encryption unit encrypting the access apparatus identification information read out from said writable-once storage area with the random number generated by said second random number generation means; and a second comparison discrimination unit comparing the access apparatus identification information encrypted by said fifth encryption unit and the access apparatus identification information from said access apparatus encrypted with the random number with each other to discriminate whether or not the access apparatus identification information encrypted by said fifth encryption unit and the access apparatus identification from said access apparatus coincide with each other.

* * * * *

UNITED STATES PATENT AND TRADEMARK OFFICE
CERTIFICATE OF CORRECTION

PATENT NO. : 6,789,177 B2 Page 1 of 1
DATED : September 7, 2004
INVENTOR(S) : Yoshiyuki Okada It is certified that error appears in the above-identified patent and that said Letters Patent is hereby corrected as shown below:

<u>Column 32,</u>
Line 5, change "are" to -- area --.

Signed and Sealed this

Ninth Day of May, 2006

JON W. DUDAS
*Director of the United States Patent and Trademark Office*